United States Patent
Pierson

(10) Patent No.: US 10,642,490 B2
(45) Date of Patent: *May 5, 2020

(54) STREAMING ENGINE WITH FETCH AHEAD HYSTERESIS

(71) Applicant: TEXAS INSTRUMENTS INCORPORATED, Dallas, TX (US)

(72) Inventor: Matthew Pierson, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,757

(22) Filed: Feb. 19, 2019

(65) Prior Publication Data

US 2019/0187903 A1    Jun. 20, 2019

Related U.S. Application Data

(63) Continuation of application No. 15/384,416, filed on Dec. 20, 2016, now Pat. No. 10,209,887.

(51) Int. Cl.
*G06F 3/06* (2006.01)
*G06F 12/0897* (2016.01)
(Continued)

(52) U.S. Cl.
CPC .......... *G06F 3/0604* (2013.01); *G06F 3/0656* (2013.01); *G06F 3/0659* (2013.01);
(Continued)

(58) Field of Classification Search
CPC ........ G06F 3/0604; G06F 9/3016; G06F 9/32; G06F 12/0875; G06F 3/0656;
(Continued)

(56) References Cited

U.S. PATENT DOCUMENTS 6,279,077 B1   8/2001  Nasserbakht et al.
2007/0101105 A1  5/2007  Diefendorff
(Continued)

FOREIGN PATENT DOCUMENTS

WO   2008103854 A1   8/2008

OTHER PUBLICATIONS

International Search Report for PCT/US2017/067648 dated Mar. 29, 2018.

*Primary Examiner* — David Yi
*Assistant Examiner* — Alan Otto
(74) *Attorney, Agent, or Firm* — Brian D. Graham; Charles A. Brill; Frank D. Cimino

(57) ABSTRACT

Disclosed embodiments relate to one or more techniques to control access by a requestor of a computing system to a shared memory resource. In one embodiment, a technique includes determining a number (N) of pending requests to be sent to the memory by the requestor, determining a number (M) of requests that the requestor is limited to sending based on an amount of buffering resources available, and comparing M to N. When N is both greater than zero and less than or equal to M, the requestor sends the N pending requests to the memory. When N is both greater than zero and greater than M, M is compared to a hysteresis value (R) and, when M is less than R, the requestor sends R of the N pending requests to the memory.

18 Claims, 26 Drawing Sheets

(51) Int. Cl.
  *G06F 12/0875* (2016.01)
  *G06F 9/30* (2018.01)
  *G06F 9/32* (2018.01)
  *G06F 9/38* (2018.01)
  *G06F 13/14* (2006.01)

(52) U.S. Cl.
  CPC .......... *G06F 3/0683* (2013.01); *G06F 9/3004* (2013.01); *G06F 9/3016* (2013.01); *G06F 9/30047* (2013.01); *G06F 9/30076* (2013.01); *G06F 9/32* (2013.01); *G06F 9/3802* (2013.01); *G06F 9/383* (2013.01); *G06F 12/0875* (2013.01); *G06F 12/0897* (2013.01); *G06F 13/14* (2013.01); *G06F 2212/1016* (2013.01); *G06F 2212/452* (2013.01); *G06F 2212/60* (2013.01)

(58) Field of Classification Search
  CPC .... G06F 3/0659; G06F 3/0683; G06F 9/3802; G06F 12/0897; G06F 9/3004; G06F 2212/452; G06F 2212/60
  See application file for complete search history.

(56) References Cited

U.S. PATENT DOCUMENTS

| | | | |
|---|---|---|---|
| 2012/0320772 A1* | 12/2012 | Frederiks | H04L 47/10 370/252 |
| 2015/0019840 A1 | 1/2015 | Anderson et al. | |
| 2015/0350381 A1* | 12/2015 | Chang | G06F 9/5077 709/203 |
| 2017/0171279 A1* | 6/2017 | Zhang | H04L 49/90 |

* cited by examiner

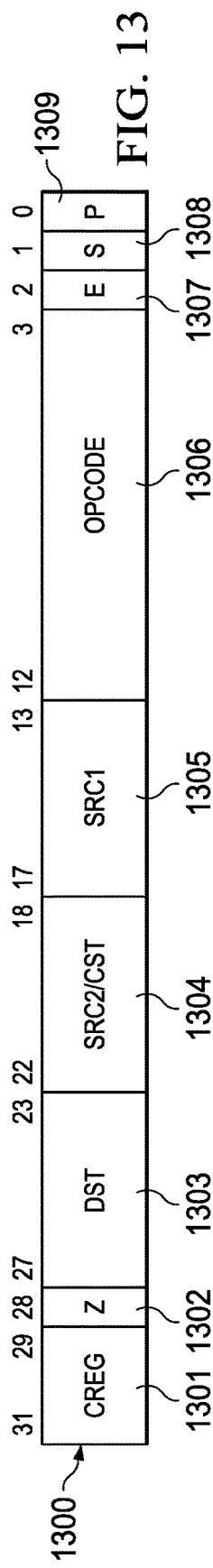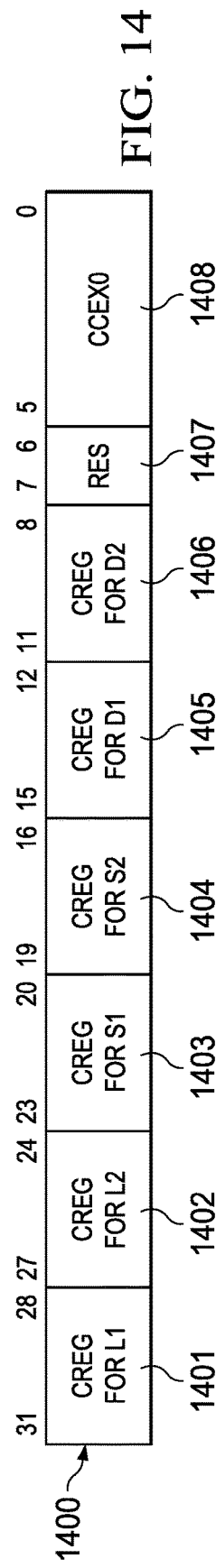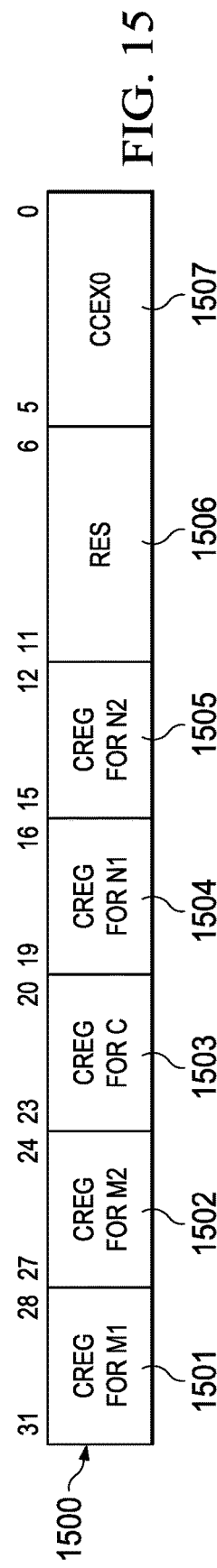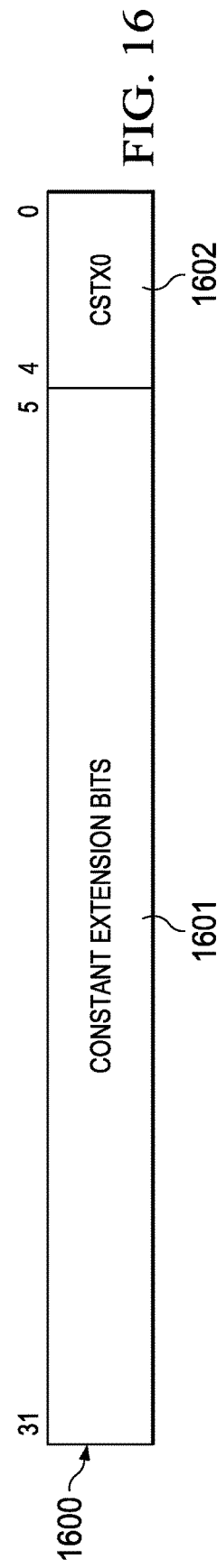

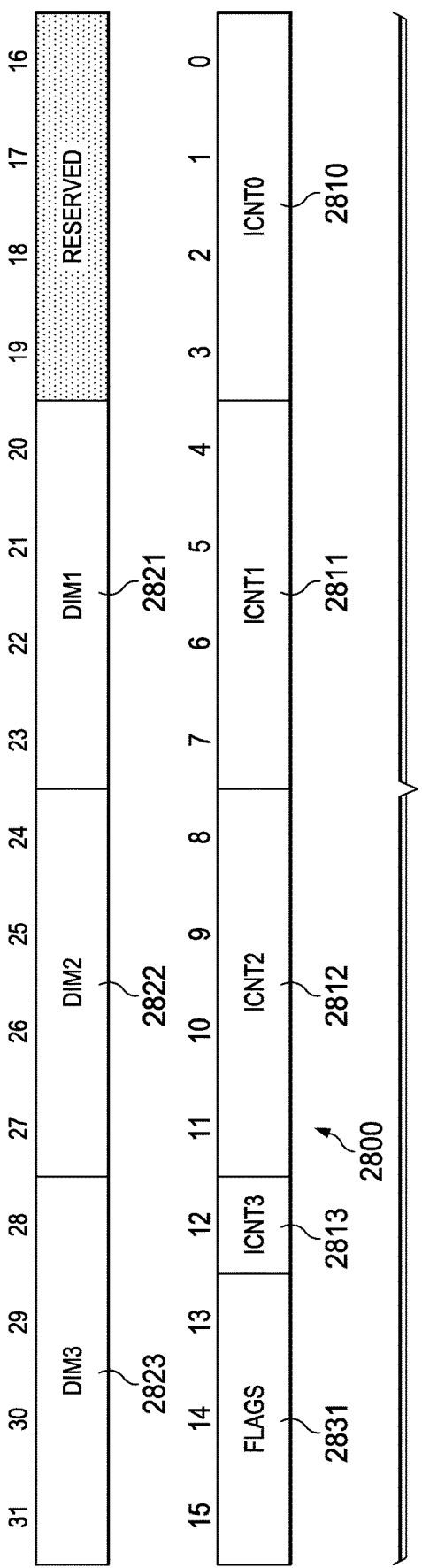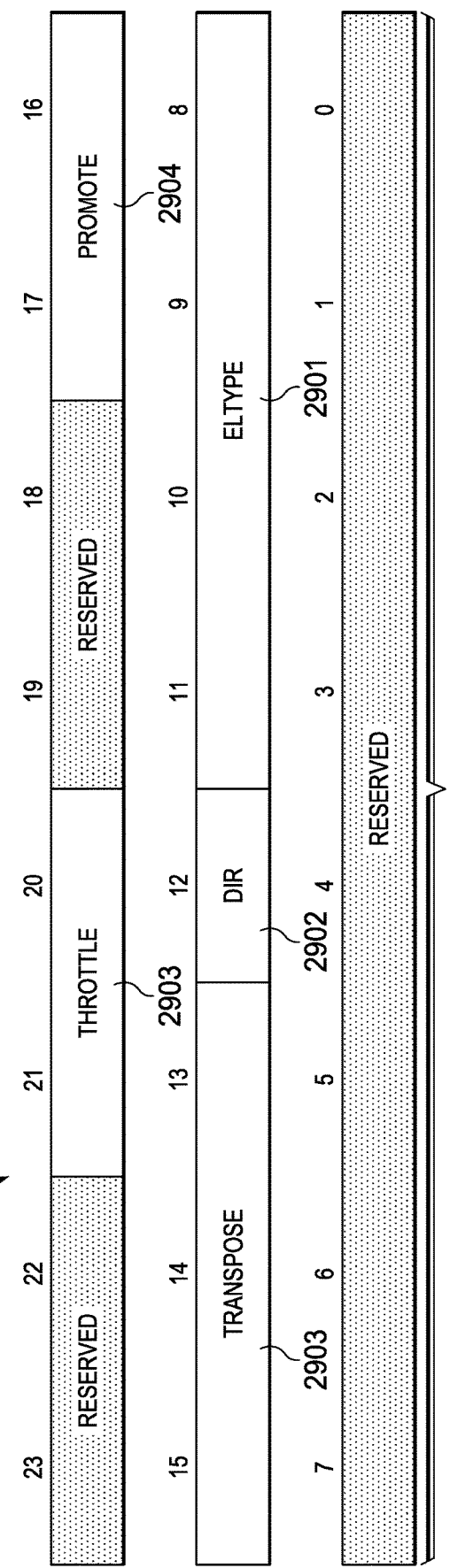

STREAMING ENGINE WITH FETCH AHEAD HYSTERESIS

CROSS-REFERENCE TO RELATED APPLICATION(S)

This application is a continuation of U.S. patent application Ser. No. 15/384,416 filed on Dec. 20, 2016, which is incorporated herein by reference.

U.S. patent application Ser. No. 15/384,416 and is an improvement over U.S. patent application Ser. No. 14/331,986 filed Jul. 15, 2014, which claims priority from U.S. Provisional Patent Application Ser. No. 61/846,148 filed Jul. 15, 2013, which are also incorporated herein by reference.

TECHNICAL FIELD

The technical field of this invention is digital data processing and more specifically control of streaming engine used for operand fetching.

BACKGROUND

Modern digital signal processors (DSP) face multiple challenges. Workloads continue to increase, requiring increasing bandwidth. Systems on a chip (SOC) continue to grow in size and complexity. Memory system latency severely impacts certain classes of algorithms. As transistors get smaller, memories and registers become less reliable. As software stacks get larger, the number of potential interactions and errors becomes larger.

Memory bandwidth and scheduling are a problem for digital signal processors operating on real-time data. Digital signal processors operating on real-time data typically receive an input data stream, perform a filter function on the data stream (such as encoding or decoding) and output a transformed data stream. The system is called real-time because the application fails if the transformed data stream is not available for output when scheduled. Typical video encoding requires a predictable but non-sequential input data pattern. Often the corresponding memory accesses are difficult to achieve within available address generation and memory access resources. A typical application requires memory access to load data registers in a data register file and then supply to functional units which perform the data processing.

SUMMARY

This invention controls accesses to a shared memory or resource to be bursty. An access controller determines whether at least one access is ready for issue. The access controller determines if the number of accesses ready for issue N is less than a current buffer capacity M. If so, the access controller issues all ready accesses. Otherwise, the access controller determines if the current buffer capacity M is less than a hysteresis amount R. If the current buffer capacity M is less than the hysteresis amount R, the access controller waits until the current buffer capacity M is greater than or equal to the hysteresis amount R. If the current buffer capacity M is greater than or equal the hysteresis amount R, the access controller issues R accesses. This serves to bunch accesses to the hysteresis amount R when buffer capacity constrained.

In the preferred embodiment the access requesting unit is a streaming engine employed in a digital signal processor. A fixed data stream sequence of plural nested loops is specified by a control register. Once started the data stream is read only and cannot be written. The ready accesses are the memory accesses for remaining data elements in the data stream. The current buffer capacity is the amount of unused storage space in a stream buffer. The hysteresis amount is preferably set by data is a memory mapped data register.

BRIEF DESCRIPTION OF THE DRAWINGS

These and other aspects of this invention are illustrated in the drawings, in which:

FIG. 13 illustrates an example of the instruction coding of instructions used by this invention;

FIG. 14 illustrates the bit coding of a condition code extension slot 0;

FIG. 15 illustrates the bit coding of a condition code extension slot 1;

FIG. 16 illustrates the bit coding of a constant extension slot 0;

FIG. 28 illustrates a stream template register of this invention;

FIG. 29 illustrates sub-field definitions of the flags field of the stream template register of this invention;

DETAILED DESCRIPTION

Figure 1:
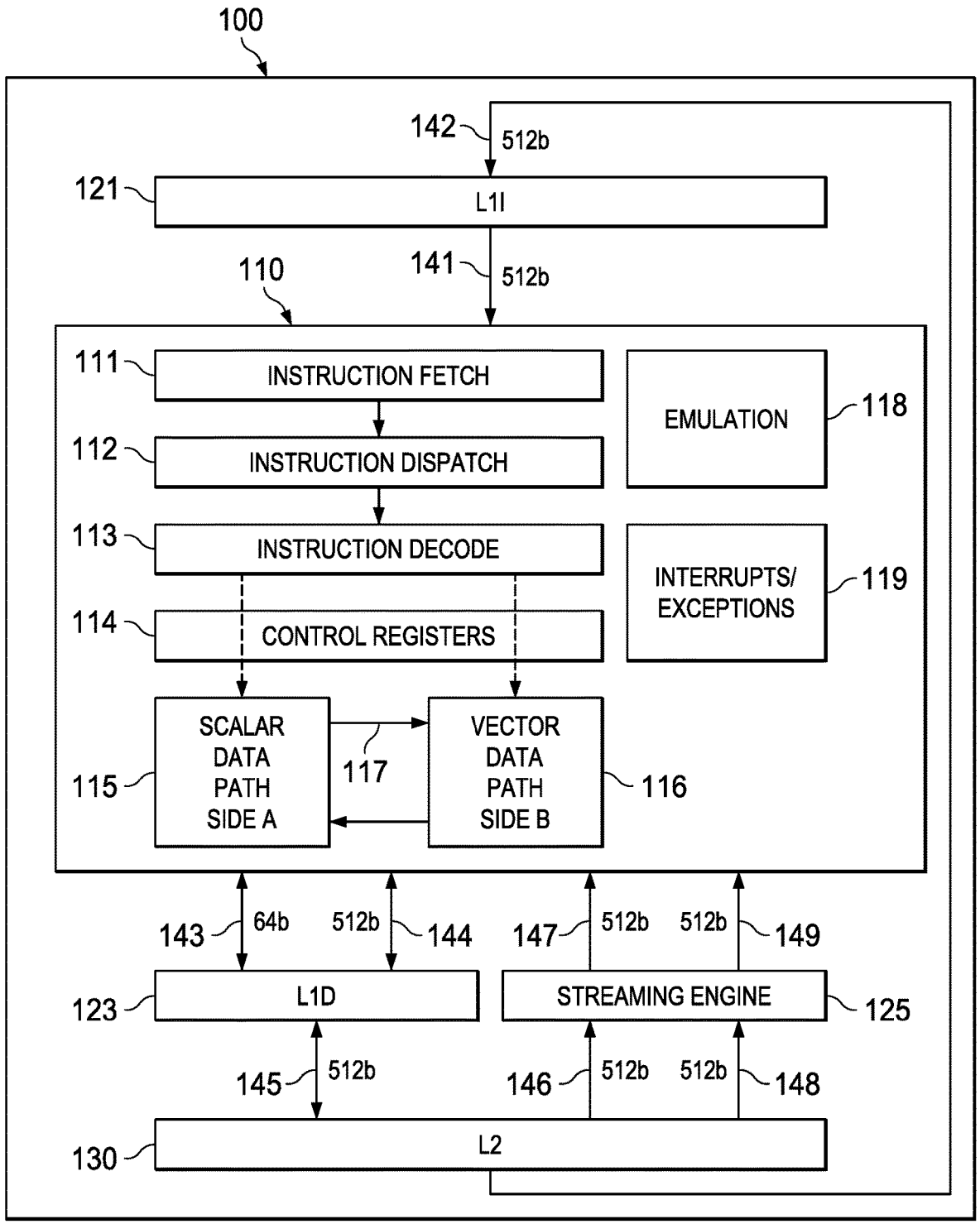
FIG. 1 illustrates a dual scalar/vector datapath processor according to one embodiment of this invention.

FIG. 1 illustrates a dual scalar/vector datapath processor according to a preferred embodiment of this invention. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In the preferred embodiment of processor 100 level two combined instruction/data cache 130 stores both instructions to back up level one instruction cache 121 and data to back up level one data cache 123. In the preferred embodiment level two combined instruction/data cache 130 is further connected to higher level cache and/or main memory in a manner not illustrated in FIG. 1. In the preferred embodiment central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In the preferred embodiment the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In the preferred embodiment of this invention, central processing unit core 110 includes plural functional units to perform instruction specified data processing tasks. Instruction dispatch unit 112 determines the target functional unit of each fetched instruction. In the preferred embodiment central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In the preferred embodiment instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116 in a manner not relevant to this invention. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enable central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined cache 130 to register files of vector datapath side B. This provides controlled data movement from memory (as cached in level two combined cache 130) directly to functional unit operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit core 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit core 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit core 110 data reads and data writes.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with the preferred embodiment of this invention.

In the preferred embodiment of this invention, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
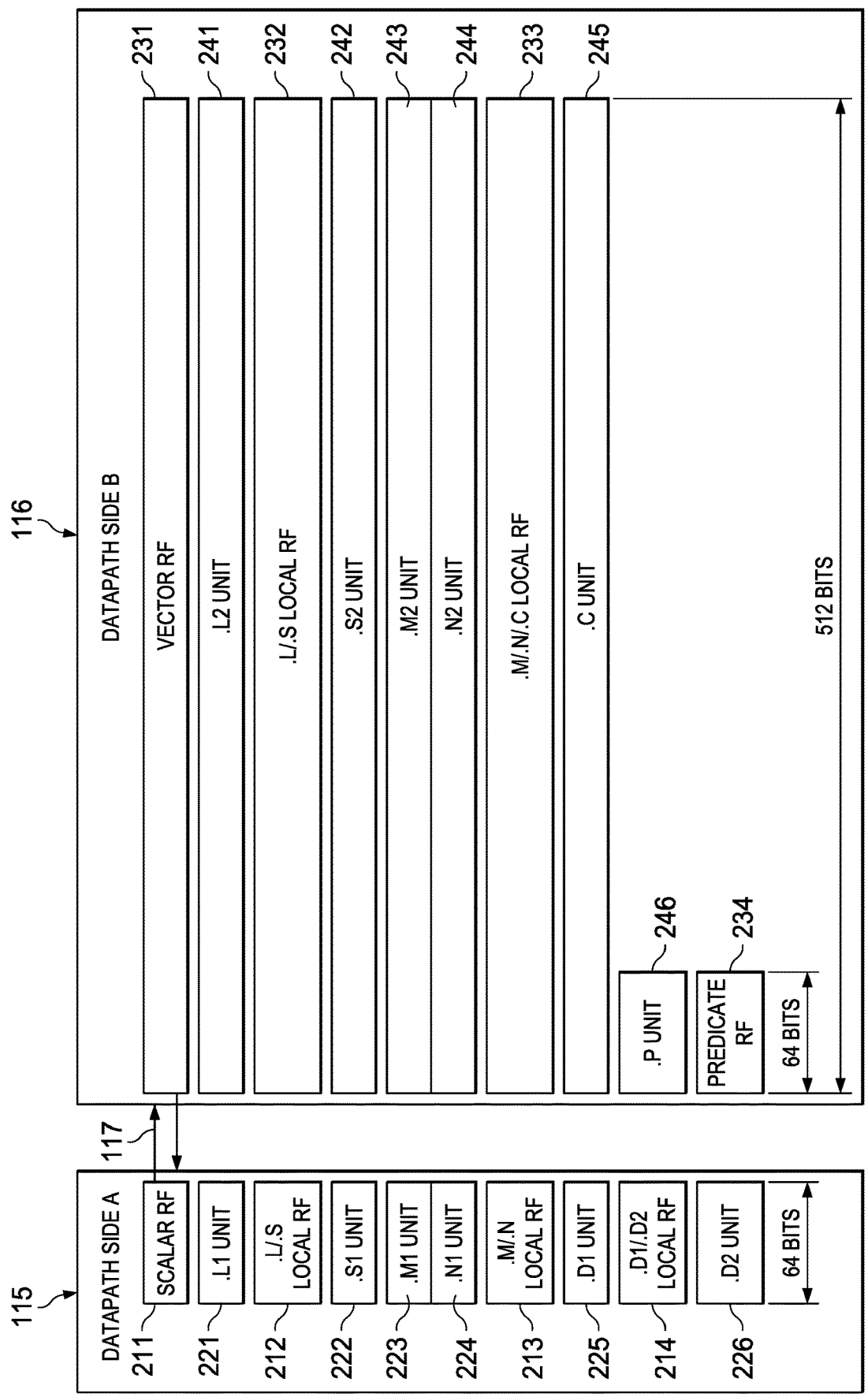
FIG. 2 illustrates the registers and functional units in the dual scalar/vector datapath processor illustrated in FIG. 1.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232, or predicate register file 234. S2 unit 242 preferably performs instructions similar to S1 unit 222 except on wider 512-bit data. The result may be written into an instruction specified register of global vector register file 231, L2/S2 local register file 232, M2/N2/C local register file 233 or predicate register file 234. There may be certain double operations (called dual issued instructions) that employ both L2 unit 241 and the S2 unit 242 together. The result may be written into an instruction specified register of global vector register file 231, L2/S2 local register file 232 or M2/N2/C local register file 233.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 includes also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include AND, ANDN, OR, XOR, NOR, BITR, NEG, SET, BITCNT, RMBD, BIT Decimate and Expand. A commonly expected use of P unit 246 includes manipulation of the SIMD vector comparison results for use in control of a further SIMD vector operation.

Figure 3:
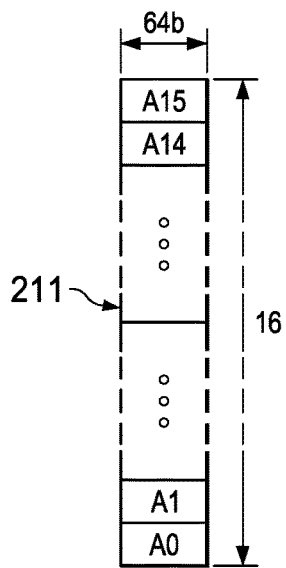
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
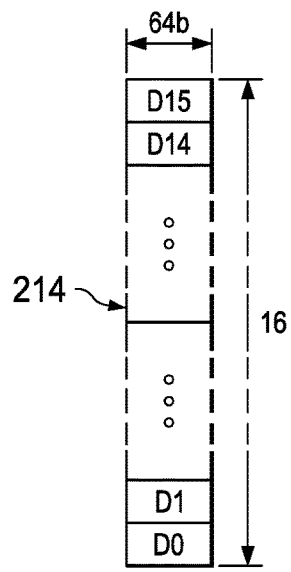
FIG. 4 illustrates a local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
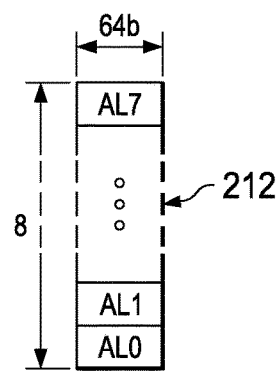
FIG. 5 illustrates a local scalar register file shared by multiply functional units.

FIG. 5 illustrates L1/S1 local register file 212. The embodiment illustrated in FIG. 5 has 8 independent 64-bit wide scalar registers designated AL0 to AL7. The preferred instruction coding (see FIG. 13) permits L1/S1 local register file 212 to include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
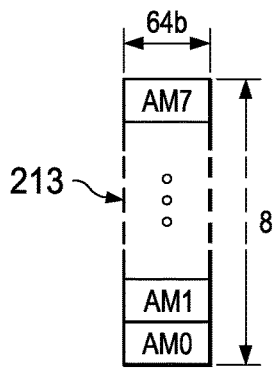
FIG. 6 illustrates a local scalar register file shared by load/store units.

FIG. 6 illustrates M1/N1 local register file 213. The embodiment illustrated in FIG. 6 has 8 independent 64-bit wide scalar registers designated AM0 to AM7. The preferred instruction coding (see FIG. 13) permits M1/N1 local register file 213 to include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
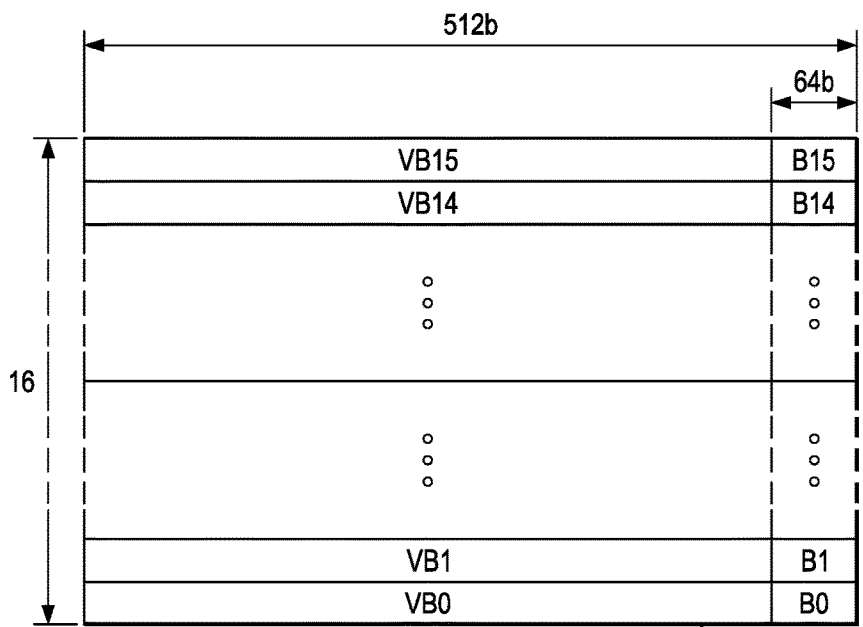
FIG. 7 illustrates a global vector register file.

FIG. 7 illustrates global vector register file 231. There are 16 independent 512-bit wide scalar registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global vector register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
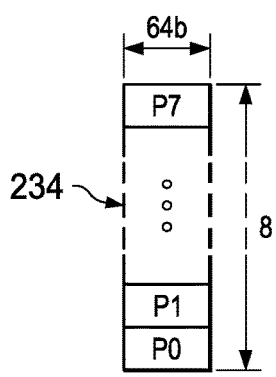
FIG. 8 illustrates a predicate register file.

FIG. 8 illustrates P local register file 234. There are 8 independent 64-bit wide registers designated P0 to P15. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

Figure 9:
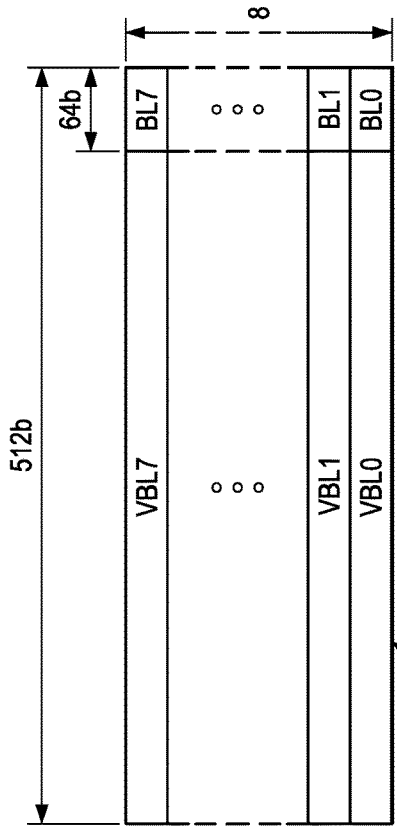
FIG. 9 illustrates a local vector register file shared by arithmetic functional units.

FIG. 9 illustrates L2/S2 local register file 232. The embodiment illustrated in FIG. 9 has 8 independent 512-bit wide scalar registers. The preferred instruction coding (see FIG. 13) permits L2/S2 local register file 232 to include up to 16 registers. The embodiment of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/S2 local vector register file 232. Only L2 unit 241 and S2 unit 242 can read from L2/S2 local vector register file 232.

Figure 10:
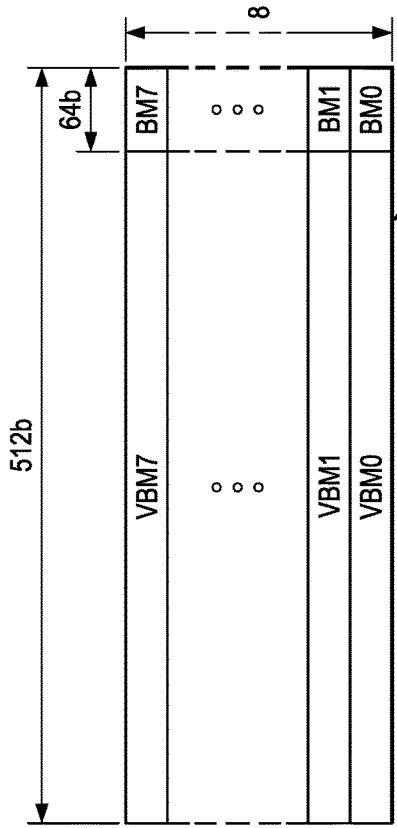
FIG. 10 illustrates a local vector register file shared by multiply and correlation functional units.

FIG. 10 illustrates M2/N2/C local register file 233. The embodiment illustrated in FIG. 10 has 8 independent 512-bit wide scalar registers. The preferred instruction coding (see FIG. 13) permits M2/N2/C local register file 233 to include up to 16 registers. The embodiment of FIG. 10 implements only 8 registers to reduce circuit size and complexity. Each register of M2/N2/C local register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

The provision of global register files accessible by all functional units of a side and local register files accessible by only some of the functional units of a side is a design choice. This invention could be practiced employing only one type of register file corresponding to the disclosed global register files.

Crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within central processing unit core 110. Streaming engine 125 is thus useful for real-time digital filtering operations on well-behaved data. Streaming engine 125 frees these memory fetch tasks from the corresponding central processing unit core 110 enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

Central processing unit core 110 operates on an instruction pipeline. Instructions are fetched in instruction packets of fixed length further described below. All instructions require the same number of pipeline phases for fetch and decode, but require a varying number of execute phases.

Figure 11:
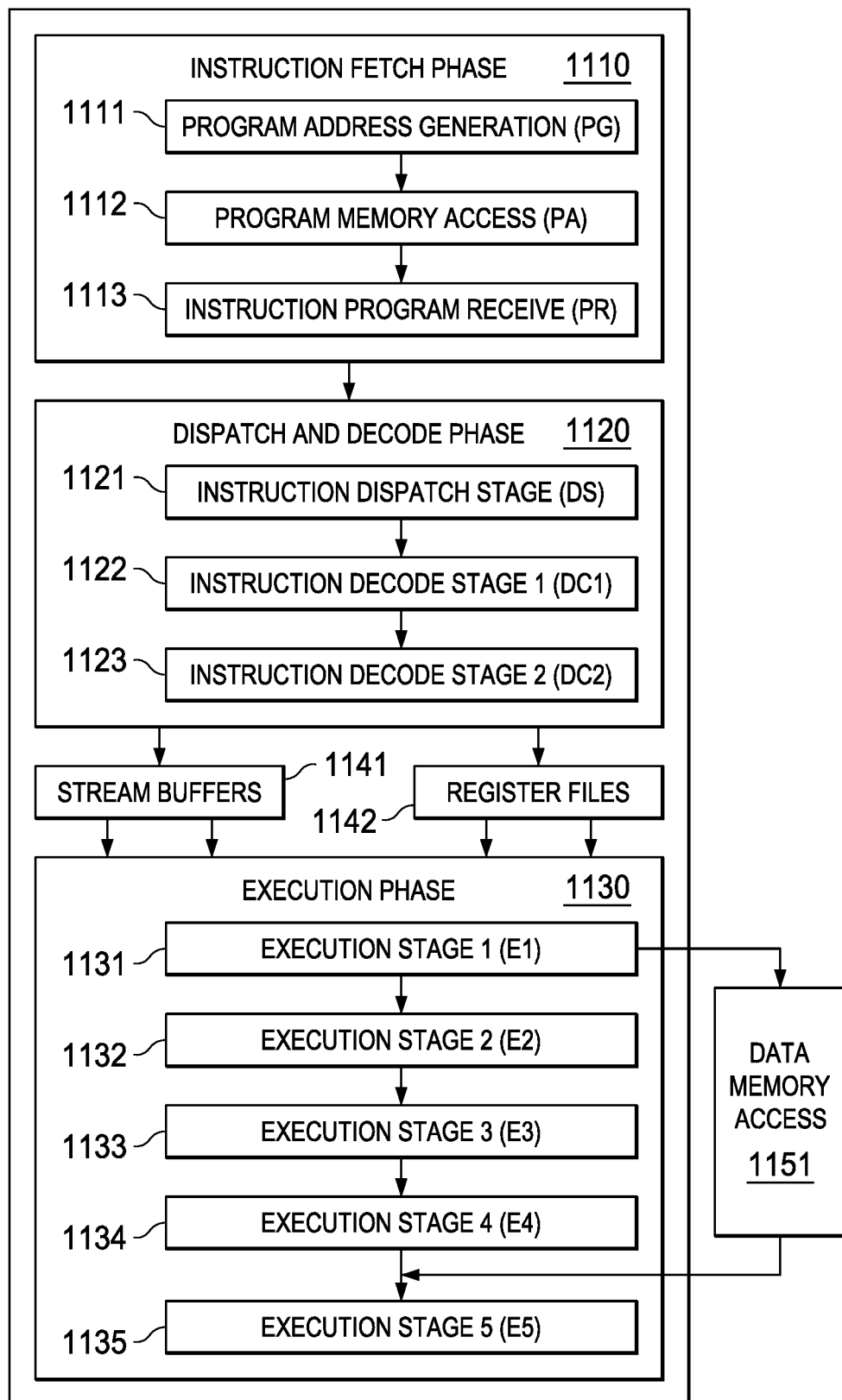
FIG. 11 illustrates pipeline phases of a central processing unit according to a preferred embodiment of this invention.

FIG. 11 illustrates the following pipeline phases: program fetch phase 1110, dispatch and decode phases 1120 and execution phases 1130. Program fetch phase 1120 includes three stages for all instructions. Dispatch and decode phases include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in central processing unit core 110 and the read request is sent to the memory controller for the level one instruction cache L1I. During the program access stage 1112 (PA) the level one instruction cache L1I processes the request, accesses the data in its memory and sends a fetch packet to the central processing unit core 110 boundary. During the program receive stage 1113 (PR) central processing unit core 110 registers the fetch packet.

Figure 12:
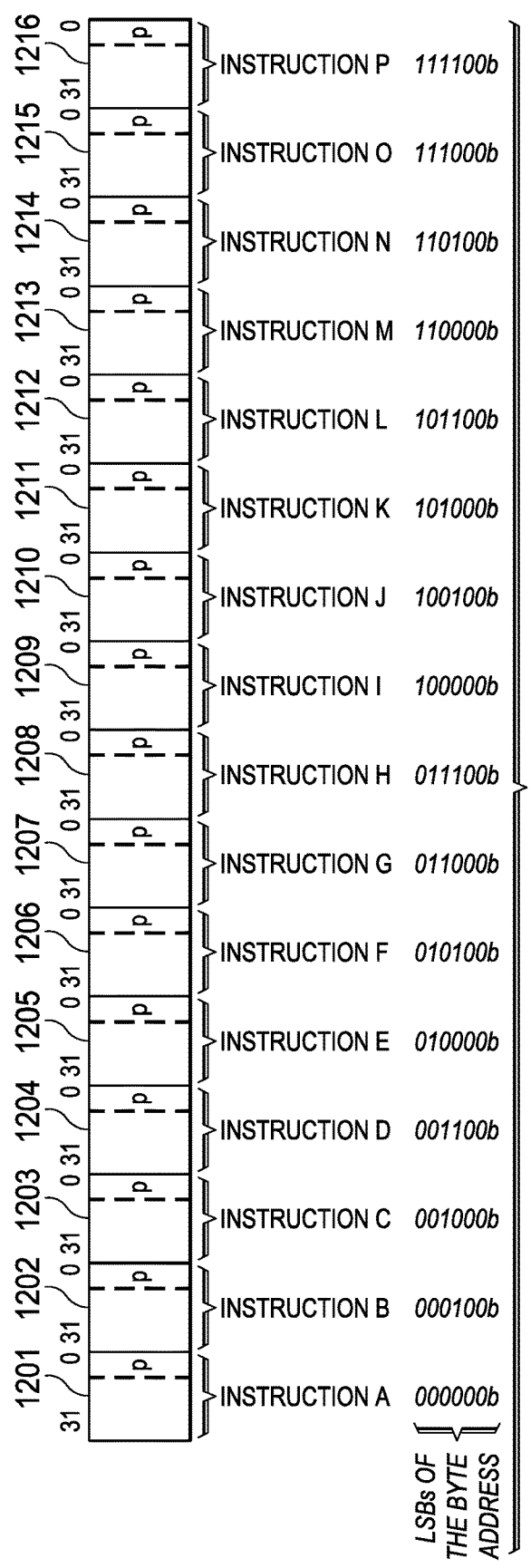
FIG. 12 illustrates sixteen instructions of a single fetch packet.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. The preferred embodiment employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by predetermined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

Central processing unit core 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In the preferred embodiment an execute packet can contain up to sixteen instructions. No two instructions in an execute packet may use the same functional unit. A slot is one of five types: 1) a self-contained instruction executed on one of the functional units of central processing unit core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1110 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as the reading of operands from the register files.

Execution phases 1130 includes execution stages 1131 to 1135 (E1 to E5). Different types of instructions require different numbers of these stages to complete their execution. These stages of the pipeline play an important role in understanding the device state at central processing unit core 110 cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the central processing unit core 110 boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding 1300 of functional unit instructions used by this invention. Those skilled in the art would realize that other instruction codings are feasible and within the scope of this invention. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The creg field 1301 (bits 29 to 31) and the z bit 1302 (bit 28) are optional fields used in conditional instructions. These bits are used for conditional instructions to identify the predicate register and the condition. The z bit 1302 (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field 1301 and the z field 1302 are encoded in the instruction as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Execution of a conditional instruction is conditional upon the value stored in the specified data register. This data register is in the global scalar register file 211 for all functional units. Note that "z" in the z bit column refers to the zero/not zero comparison selection noted above and "x" is a don't care state. This coding can only specify a subset of the 16 global registers as predicate registers. This selection was made to preserve bits in the instruction coding. Note that unconditional instructions do not have these optional bits. For unconditional instructions these bits in fields 1301 and 1302 (28 to 31) are preferably used as additional opcode bits.

The dst field 1303 (bits 23 to 27) specifies a register in a corresponding register file as the destination of the instruction results.

The src2/cst field 1304 (bits 18 to 22) has several meanings depending on the instruction opcode field (bits 3 to 12 for all instructions and additionally bits 28 to 31 for unconditional instructions). The first meaning specifies a register of a corresponding register file as the second operand. The second meaning is an immediate constant. Depending on the instruction type, this is treated as an unsigned integer and zero extended to a specified data length or is treated as a signed integer and sign extended to the specified data length.

The src1 field 1305 (bits 13 to 17) specifies a register in a corresponding register file as the first source operand.

The opcode field 1306 (bits 3 to 12) for all instructions (and additionally bits 28 to 31 for unconditional instructions) specifies the type of instruction and designates appropriate instruction options. This includes unambiguous designation of the functional unit used and operation performed. A detailed explanation of the opcode is beyond the scope of this invention except for the instruction options detailed below.

The e bit 1307 (bit 2) is only used for immediate constant instructions where the constant may be extended. If e=1, then the immediate constant is extended in a manner detailed below. If e=0, then the immediate constant is not extended. In that case the immediate constant is specified by the src2/cst field 1304 (bits 18 to 22). Note that this e bit 1307 is used for only some instructions. Accordingly, with proper coding this e bit 1307 may be omitted from instructions which do not need it and this bit used as an additional opcode bit.

The s bit 1308 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1309 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

There are two different condition code extension slots. Each execute packet can contain one each of these unique 32-bit condition code extension slots which contains the 4-bit creg/z fields for the instructions in the same execute packet. FIG. 14 illustrates the coding for condition code extension slot 0 and FIG. 15 illustrates the coding for condition code extension slot 1.

FIG. 14 illustrates the coding for condition code extension slot 0 having 32 bits. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 226 instruction in the same execute packet. Field 1407 (bits 6 and 7) is unused/reserved. Field 1408 (bits 0 to 5) are coded a set of unique bits (CCEX0) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 225 and D2 unit 226 instruction in the same execution packet. These creg/z bits are interpreted as shown in Table 1. If the corresponding instruction is conditional (includes creg/z bits) the corresponding bits in the condition code extension slot 0 override the condition code bits in the instruction. Note that no execution packet can have more than one instruction directed to a particular execution unit. No execute packet of instructions can contain more than one condition code extension slot 0. Thus the mapping of creg/z bits to functional unit instruction is unambiguous. Setting the creg/z bits equal to "0000" makes the instruction unconditional. Thus a properly coded condition code extension slot 0 can make some corresponding instructions conditional and some unconditional.

FIG. 15 illustrates the coding for condition code extension slot 1 having 32 bits. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 6 to 11) is unused/reserved. Field 1507 (bits 0 to 5) are coded a set of unique bits (CCEX1) to identify the condition code extension slot 1. Once this unique ID of condition code extension slot 1 is detected, the corresponding creg/z bits are employed to control conditional execution of any M1 unit 223, M2 unit 243, C unit 245, N1 unit 224 and N2 unit 244 instruction in the same execution packet. These creg/z bits are interpreted as shown in Table 1. If the corresponding instruction is conditional (includes creg/z bits) the corresponding bits in the condition code extension slot 1 override the condition code bits in the instruction. Note that no execution packet can have more than one instruction directed to a particular execution unit. No execute packet of instructions can contain more than one condition code extension slot 1. Thus the mapping of creg/z bits to functional unit instruction is unambiguous. Setting the creg/z bits equal to "0000" makes the instruction unconditional. Thus a properly coded condition code extension slot 1 can make some instructions conditional and some unconditional.

It is feasible for both condition code extension slot 0 and condition code extension slot 1 to include a p bit to define an execute packet as described above in conjunction with FIG. 13. In the preferred embodiment, as illustrated in FIGS. 14 and 15, code extension slot 0 and condition code extension slot 1 preferably have bit 0 (p bit) always encoded as 1. Thus neither condition code extension slot 0 nor condition code extension slot 1 can be in the last instruction slot of an execute packet.

There are two different constant extension slots. Each execute packet can contain one each of these unique 32-bit constant extension slots which contains 27 bits to be concatenated as high order bits with the 5-bit constant field 1305 to form a 32-bit constant. As noted in the instruction coding description above only some instructions define the src2/cst field 1304 as a constant rather than a source register identifier. At least some of those instructions may employ a constant extension slot to extend this constant to 32 bits.

FIG. 16 illustrates the fields of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant including the target instruction scr2/cst field 1304 as the five least significant bits. Field 1602 (bits 0 to 4) are coded a set of unique bits (CSTX0) to identify the constant extension slot 0. In the preferred embodiment constant extension slot 0 1600 can only be used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. In the preferred embodiment constant extension slot 1 can only be used to extend the constant of one of an L2 unit 241 instruction, data in a D2 unit 226 instruction, an S1 unit 222 instruction, an offset in a D1 unit 225 instruction, an M1 unit 223 instruction or an N1 unit 224 instruction in the same execute packet.

Constant extension slot 0 and constant extension slot 1 are used as follows. The target instruction must be of the type permitting constant specification. As known in the art this is implemented by replacing one input operand register specification field with the least significant bits of the constant as described above with respect to scr2/cst field 1304. Instruction decoder 113 determines this case, known as an immediate field, from the instruction opcode bits. The target instruction also includes one constant extension bit (e bit 1307) dedicated to signaling whether the specified constant is not extended (preferably constant extension bit=0) or the constant is extended (preferably constant extension bit=1). If instruction decoder 113 detects a constant extension slot 0 or a constant extension slot 1, it further checks the other instructions within that execute packet for an instruction corresponding to the detected constant extension slot. A constant extension is made only if one corresponding instruction has a constant extension bit (e bit 1307) equal to 1.

Figure 17:
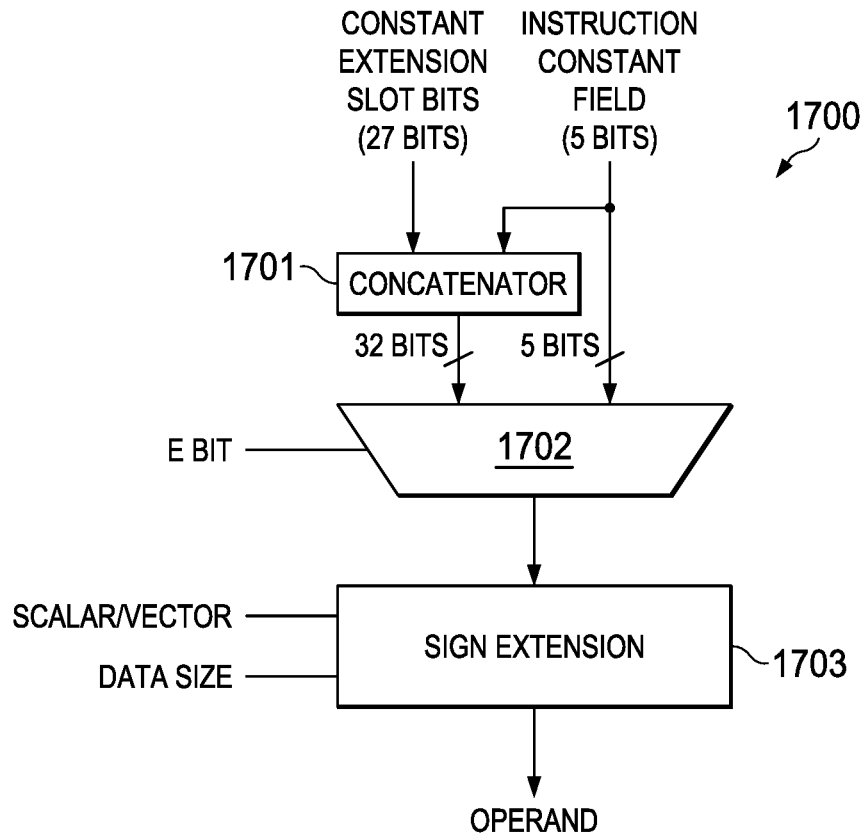
FIG. 17 is a partial block diagram illustrating constant extension.

FIG. 17 is a partial block diagram 1700 illustrating constant extension. FIG. 17 assumes that instruction decoder 113 detects a constant extension slot and a corresponding instruction in the same execute packet. Instruction decoder 113 supplies the 27 extension bits from the constant extension slot (bit field 1601) and the 5 constant bits (bit field 1305) from the corresponding instruction to concatenator 1701. Concatenator 1701 forms a single 32-bit word from these two parts. In the preferred embodiment the 27 extension bits from the constant extension slot (bit field 1601) are the most significant bits and the 5 constant bits (bit field 1305) are the least significant bits. This combined 32-bit word is supplied to one input of multiplexer 1702. The 5 constant bits from the corresponding instruction field 1305 supply a second input to multiplexer 1702. Selection of multiplexer 1702 is controlled by the status of the constant extension bit. If the constant extension bit (e bit 1307) is 1 (extended), multiplexer 1702 selects the concatenated 32-bit input. If the constant extension bit is 0 (not extended), multiplexer 1702 selects the 5 constant bits from the corresponding instruction field 1305. Multiplexer 1702 supplies this output to an input of sign extension unit 1703.

Sign extension unit 1703 forms the final operand value from the input from multiplexer 1703. Sign extension unit 1703 receives control inputs Scalar/Vector and Data Size. The Scalar/Vector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) can only perform scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode bits. P unit 246 may only perform scalar instructions. The Data Size may be 8 bits (byte B), 16 bits (half-word H), 32 bits (word W) or 64 bits (double word D).

Table 2 lists the operation of sign extension unit 1703 for the various options.

TABLE 2

| Instruction Type | Operand Size | Constant Length | Action |
|---|---|---|---|
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

It is feasible for both constant extension slot 0 and constant extension slot 1 to include a p bit to define an execute packet as described above in conjunction with FIG. 13. In the preferred embodiment, as in the case of the condition code extension slots, constant extension slot 0 and constant extension slot 1 preferably have bit 0 (p bit) always encoded as 1. Thus neither constant extension slot 0 nor constant extension slot 1 can be in the last instruction slot of an execute packet.

It is technically feasible for an execute packet to include a constant extension slot 0 or 1 and more than one corresponding instruction marked constant extended (e bit=1). For constant extension slot 0 this would mean more than one of an L1 unit 221 instruction, data in a D1 unit 225 instruction, an S2 unit 242 instruction, an offset in a D2 unit 226 instruction, an M2 unit 243 instruction or an N2 unit 244 instruction in an execute packet have an e bit of 1. For constant extension slot 1 this would mean more than one of an L2 unit 241 instruction, data in a D2 unit 226 instruction, an S1 unit 222 instruction, an offset in a D1 unit 225 instruction, an M1 unit 223 instruction or an N1 unit 224 instruction in an execute packet have an e bit of 1. Supplying the same constant extension to more than one instruction is not expected to be a useful function. Accordingly, in one embodiment instruction decoder 113 may determine this case an invalid operation and not supported. Alternately, this combination may be supported with extension bits of the constant extension slot applied to each corresponding functional unit instruction marked constant extended.

Special vector predicate instructions use registers in predicate register file 234 to control vector operations. In the current embodiment all these SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 245 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 18:
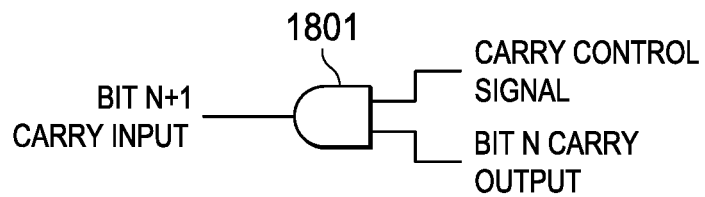
FIG. 18 illustrates the carry control for SIMD operations according to this invention.

FIG. 18 illustrates the carry control. AND gate 1801 receives the carry output of bit N within the operand wide arithmetic logic unit (64 bits for scalar datapath side A 115 functional units and 512 bits for vector datapath side B 116 functional units). AND gate 1801 also receives a carry control signal which will be further explained below. The output of AND gate 1801 is supplied to the carry input of bit N+1 of the operand wide arithmetic logic unit. AND gates such as AND gate 1801 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512 bit wide operand such as used by vector datapath side B 116 functional units which may be divided into sections of 8 bits, 16 bits, 32 bits, 64 bits, 128 bits or 256 bits. In Table 3 the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals |
|---|---|
| 8 bits (B) | –000 0000 0000 0000 0000 0000 0000 0000 0000 0000 0000 0000 0000 0000 0000 0000 |
| 16 bits (H) | –101 0101 0101 0101 0101 0101 0101 0101 0101 0101 0101 0101 0101 0101 0101 0101 |
| 32 bits (W) | –111 0111 0111 0111 0111 0111 0111 0111 0111 0111 0111 0111 0111 0111 0111 0111 |
| 64 bits (D) | –111 1111 0111 1111 0111 1111 0111 1111 0111 1111 0111 1111 0111 1111 0111 1111 |
| 128 bits | –111 1111 1111 1111 0111 1111 1111 1111 0111 1111 1111 1111 0111 1111 1111 1111 |
| 256 bits | –111 1111 1111 1111 1111 1111 1111 1111 0111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Figure 19:
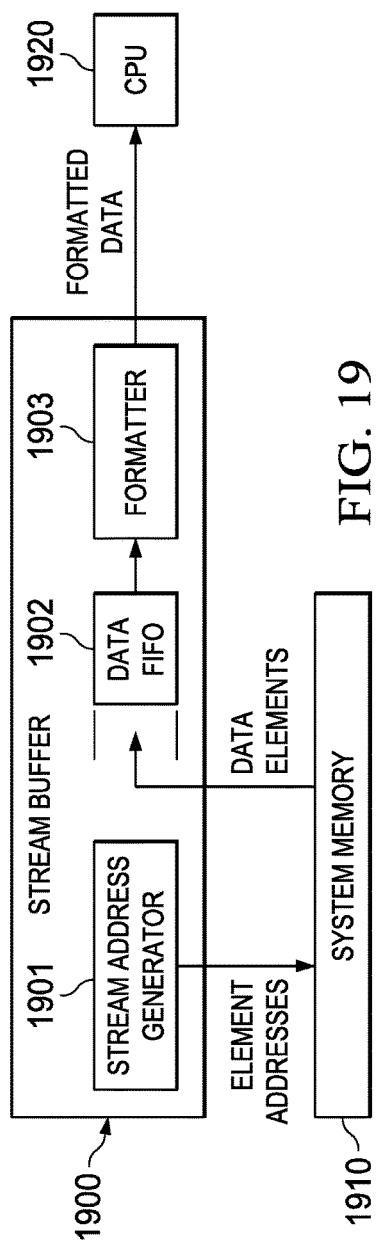
FIG. 19 illustrates a conceptual view of the streaming engines of this invention.

FIG. 19 illustrates a conceptual view of the streaming engines of this invention. FIG. 19 illustrates the process of a single stream. Streaming engine 1900 includes stream address generator 1901. Stream address generator 1901 sequentially generates addresses of the elements of the stream and supplies these element addresses to system memory 1910. Memory 1910 recalls data stored at the element addresses (data elements) and supplies these data elements to data first-in-first-out (FIFO) memory 1902. Data FIFO 1902 provides buffering between memory 1910 and CPU 1920. Data formatter 1903 receives the data elements from data FIFO memory 1902 and provides data formatting according to the stream definition. This process will be described below. Streaming engine 1900 supplies the formatted data elements from data formatter 1903 to the CPU 1920. The program on CPU 1920 consumes the data and generates an output.

Stream elements typically reside in normal memory. The memory itself imposes no particular structure upon the stream. Programs define streams and therefore impose structure, by specifying the following stream attributes: address of the first element of the stream; size and type of the elements in the stream; formatting for data in the stream; and the address sequence associated with the stream.

The streaming engine defines an address sequence for elements of the stream in terms of a pointer walking through memory. A multiple-level nested loop controls the path the pointer takes. An iteration count for a loop level indicates the number of times that level repeats. A dimension gives the distance between pointer positions of that loop level.

In a basic forward stream the innermost loop always consumes physically contiguous elements from memory. The implicit dimension of this innermost loop is 1 element. The pointer itself moves from element to element in consecutive, increasing order. In each level outside the inner loop, that loop moves the pointer to a new location based on the size of that loop level's dimension.

This form of addressing allows programs to specify regular paths through memory in a small number of parameters. Table 4 lists the addressing parameters of a basic stream.

TABLE 4

| Parameter | Definition |
| --- | --- |
| ELEM_BYTES | Size of each element in bytes |
| ICNT0 | Number of iterations for the innermost loop level 0. At loop level 0 all elements are physically contiguous DIM0 is ELEM_BYTES |
| ICNT1 | Number of iterations for loop level 1 |
| DIM1 | Number of bytes between the starting points for consecutive iterations of loop level 1 |
| ICNT2 | Number of iterations for loop level 2 |
| DIM2 | Number of bytes between the starting points for consecutive iterations of loop level 2 |
| ICNT3 | Number of iterations for loop level 3 |
| DIM3 | Number of bytes between the starting points for consecutive iterations of loop level 3 |

The definition above maps consecutive elements of the stream to increasing addresses in memory. This works well for most algorithms but not all. Some algorithms are better served by reading elements in decreasing memory addresses, reverse stream addressing. For example, a discrete convolution computes vector dot-products, as per the formula:

$$(f, g)[t] = \sum_{x=-\infty}^{\infty} f[x]g[t-x]$$

In most DSP code, f[ ] and g[ ] represent arrays in memory. For each output, the algorithm reads f[ ] in the forward direction, but reads g[ ] in the reverse direction. Practical filters limit the range of indices for [x] and [t-x] to a finite number elements. To support this pattern, the streaming engine supports reading elements in decreasing address order.

Matrix multiplication presents a unique problem to the streaming engine. Each element in the matrix product is a vector dot product between a row from the first matrix and a column from the second. Programs typically store matrices all in row-major or column-major order. Row-major order stores all the elements of a single row contiguously in memory. Column-major order stores all elements of a single column contiguously in memory. Matrices typically get stored in the same order as the default array order for the language. As a result, only one of the two matrices in a matrix multiplication map on to the streaming engine's 2-dimensional stream definition. In a typical example a first index steps through columns on array first array but rows on second array. This problem is not unique to the streaming engine. Matrix multiplication's access pattern fits poorly with most general-purpose memory hierarchies. Some software libraries transposed one of the two matrices, so that both get accessed row-wise (or column-wise) during multiplication. The streaming engine supports implicit matrix transposition with transposed streams. Transposed streams avoid the cost of explicitly transforming the data in memory. Instead of accessing data in strictly consecutive-element order, the streaming engine effectively interchanges the inner two loop dimensions in its traversal order, fetching elements along the second dimension into contiguous vector lanes.

This algorithm works, but is impractical to implement for small element sizes. Some algorithms work on matrix tiles which are multiple columns and rows together. Therefore, the streaming engine defines a separate transposition granularity. The hardware imposes a minimum granularity. The transpose granularity must also be at least as large as the element size. Transposition granularity causes the streaming engine to fetch one or more consecutive elements from dimension 0 before moving along dimension 1. When the granularity equals the element size, this results in fetching a single column from a row-major array. Otherwise, the granularity specifies fetching 2, 4 or more columns at a time from a row-major array. This is also applicable for column-major layout by exchanging row and column in the description. A parameter GRANULE indicates the transposition granularity in bytes.

Another common matrix multiplication technique exchanges the innermost two loops of the matrix multiply. The resulting inner loop no longer reads down the column of one matrix while reading across the row of another. For example the algorithm may hoist one term outside the inner loop, replacing it with the scalar value. On a vector machine, the innermost loop can be implements very efficiently with a single scalar-by-vector multiply followed by a vector add. The central processing unit core 110 of this invention lacks a scalar-by-vector multiply. Programs must instead duplicate the scalar value across the length of the vector and use a vector-by-vector multiply. The streaming engine of this invention directly supports this and related use models with an element duplication mode. In this mode, the streaming engine reads a granule smaller than the full vector size and replicates that granule to fill the next vector output.

The streaming engine treats each complex number as a single element with two sub-elements that give the real and imaginary (rectangular) or magnitude and angle (polar) portions of the complex number. Not all programs or peripherals agree what order these sub-elements should appear in memory. Therefore, the streaming engine offers the ability to swap the two sub-elements of a complex number with no cost. This feature swaps the halves of an element without interpreting the contents of the element and can be used to swap pairs of sub-elements of any type, not just complex numbers.

Algorithms generally prefer to work at high precision, but high precision values require more storage and bandwidth than lower precision values. Commonly, programs will store data in memory at low precision, promote those values to a higher precision for calculation and then demote the values to lower precision for storage. The streaming engine supports this directly by allowing algorithms to specify one level of type promotion. In the preferred embodiment of this invention every sub-element may be promoted to the next larger type size with either sign or zero extension for integer types. It is also feasible that the streaming engine may support floating point promotion, promoting 16-bit and 32-bit floating point values to 32-bit and 64-bit formats, respectively.

The streaming engine defines a stream as a discrete sequence of elements, the central processing unit core 110 consumes elements packed contiguously in vectors. Vectors resemble streams in as much as they contain multiple homogeneous elements with some implicit sequence. Because the streaming engine reads streams, but the central processing unit core 110 consumes vectors, the streaming engine must map streams onto vectors in a consistent way.

Vectors consist of equal-sized lanes, each lane containing a sub-element. The central processing unit core 110 designates the rightmost lane of the vector as lane 0, regardless of device's current endian mode. Lane numbers increase right-to-left. The actual number of lanes within a vector varies depending on the length of the vector and the data size of the sub-element.

Figure 20:
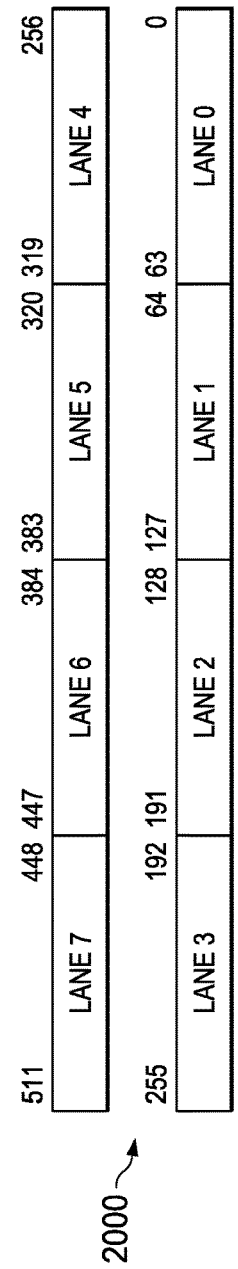
FIG. 20 illustrates a first example of lane allocation in a vector.

FIG. 20 illustrates a first example of lane allocation in a vector. Vector 2000 is divided into 8 64-bit lanes (8×64 bits=512 bits the vector length). Lane 0 includes bits 0 to 63; line 1 includes bits 64 to 127; lane 2 includes bits 128 to 191; lane 3 includes bits 192 to 255, lane 4 includes bits 256 to 319, lane 5 includes bits 320 to 383, lane 6 includes bits 384 to 447 and lane 7 includes bits 448 to 511.

Figure 21:
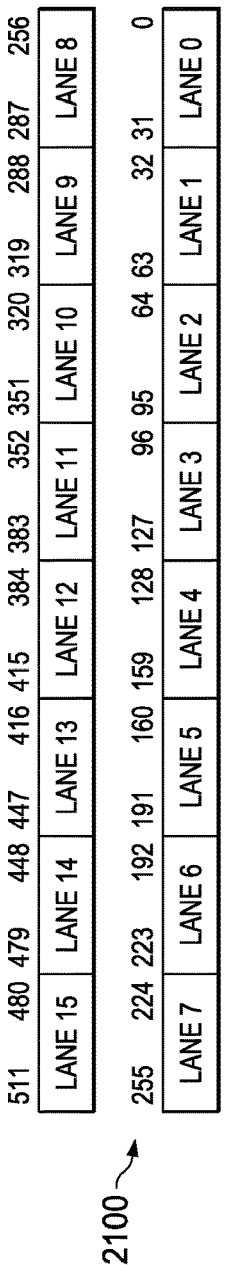
FIG. 21 illustrates a second example of lane allocation in a vector.

FIG. 21 illustrates a second example of lane allocation in a vector. Vector 2100 is divided into 16 32-bit lanes (16×32 bits=512 bits the vector length). Lane 0 includes bits 0 to 31; line 1 includes bits 32 to 63; lane 2 includes bits 64 to 95; lane 3 includes bits 96 to 127; lane 4 includes bits 128 to 159; lane 5 includes bits 160 to 191; lane 6 includes bits 192 to 223; lane 7 includes bits 224 to 255; lane 8 includes bits 256 to 287; line 9 occupied bits 288 to 319; lane 10 includes bits 320 to 351; lane 11 includes bits 352 to 383; lane 12 includes bits 384 to 415; lane 13 includes bits 416 to 447; lane 14 includes bits 448 to 479; and lane 15 includes bits 480 to 511.

The streaming engine maps the innermost stream dimension directly to vector lanes. It maps earlier elements within that dimension to lower lane numbers and later elements to higher lane numbers. This is true regardless of whether this particular stream advances in increasing or decreasing address order. Whatever order the stream defines, the streaming engine deposits elements in vectors in increasing-lane order. For non-complex data, it places the first element in lane 0 of the first vector central processing unit core 110 fetches, the second in lane 1, and so on. For complex data, the streaming engine places the first element in lanes 0 and 1, second in lanes 2 and 3, and so on. Sub-elements within an element retain the same relative ordering regardless of the stream direction. For non-swapped complex elements, this places the sub-elements with the lower address of each pair in the even numbered lanes, and the sub-elements with the higher address of each pair in the odd numbered lanes. Swapped complex elements reverse this mapping.

The streaming engine fills each vector central processing unit core 110 fetches with as many elements as it can from the innermost stream dimension. If the innermost dimension is not a multiple of the vector length, the streaming engine pads that dimension out to a multiple of the vector length with zeros. Thus for higher-dimension streams, the first element from each iteration of an outer dimension arrives in lane 0 of a vector. The streaming engine always maps the innermost dimension to consecutive lanes in a vector. For transposed streams, the innermost dimension consists of groups of sub-elements along dimension 1, not dimension 0, as transposition exchanges these two dimensions.

Two dimensional streams exhibit great variety as compared to one dimensional streams. A basic two dimensional stream extracts a smaller rectangle from a larger rectangle. A transposed 2-D stream reads a rectangle column-wise instead of row-wise. A looping stream, where the second dimension overlaps first executes a finite impulse response (FIR) filter taps which loops repeatedly or FIR filter samples which provide a sliding window of input samples.

Figure 22:
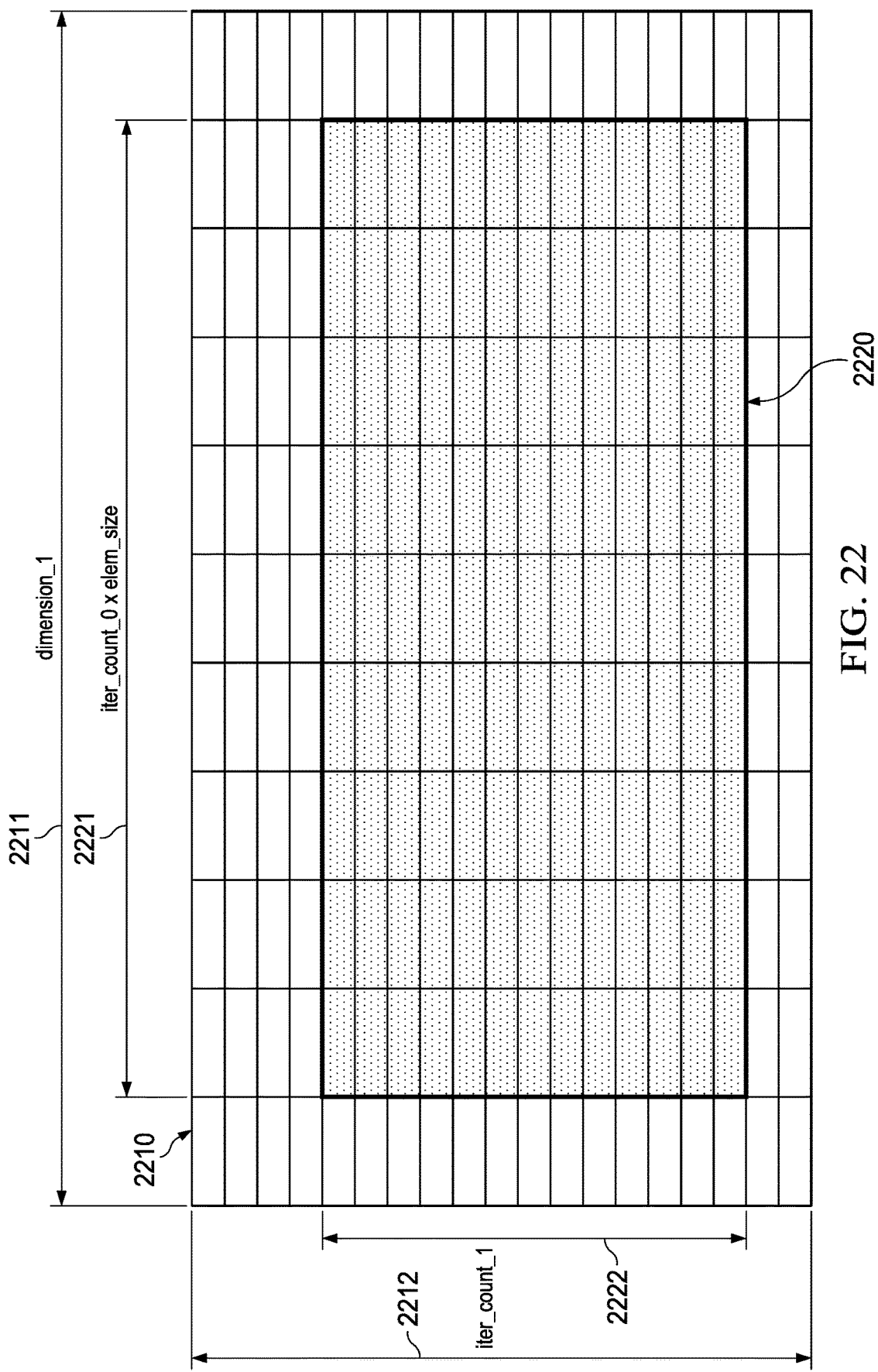
FIG. 22 illustrates a basic two dimensional stream.

FIG. 22 illustrates a basic two dimensional stream. The inner two dimensions, represented by ELEM_BYTES, ICNT0, DIM1 and ICNT1 give sufficient flexibility to describe extracting a smaller rectangle 2220 having dimensions 2221 and 2222 from a larger rectangle 2210 having dimensions 2211 and 2212. In this example rectangle 2220 is a 9 by 13 rectangle of 64-bit values and rectangle 2210 is a larger 11 by 19 rectangle. The following stream parameters define this stream:

ICNT0=9
ELEM_BYTES=8
ICNT1=13
DIM1=88 (11 times 8)

Thus the iteration count in the 0 dimension 2221 is 9. The iteration count in the 1 direction 2222 is 13. Note that the ELEM_BYTES only scales the innermost dimension. The first dimension has ICNT0 elements of size ELEM_BYTES. The stream address generator does not scale the outer dimensions. Therefore, DIM1=88, which is 11 elements scaled by 8 bytes per element.

Figure 23:
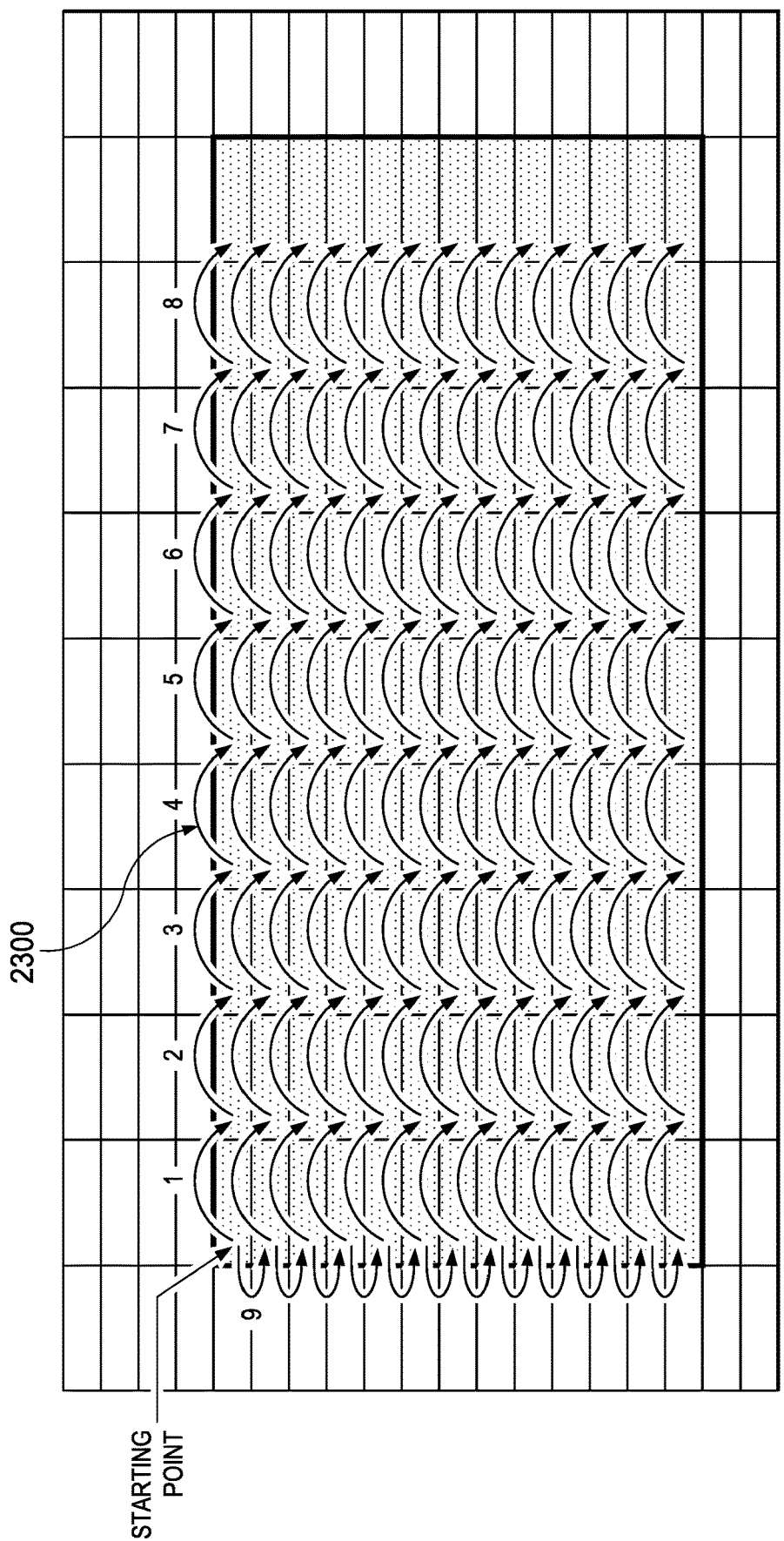
FIG. 23 illustrates the order of elements within the example stream of FIG. 21.

FIG. 23 illustrates the order of elements within this example stream. The streaming engine fetches elements for the stream in the order illustrated in order 2300. The first 9 elements come from the first row of rectangle 2220, left-to-right in hops 1 to 8. The 10th through 24th elements comes from the second row, and so on. When the stream moves from the 9th element to the 10th element (hop 9 in FIG. 23), the streaming engine computes the new location based on the pointer's position at the start of the inner loop, not where the pointer ended up at the end of the first dimension. This makes DIM1 independent of ELEM_BYTES and ICNT0. DIM1 always represents the distance between the first bytes of each consecutive row.

Figure 24:
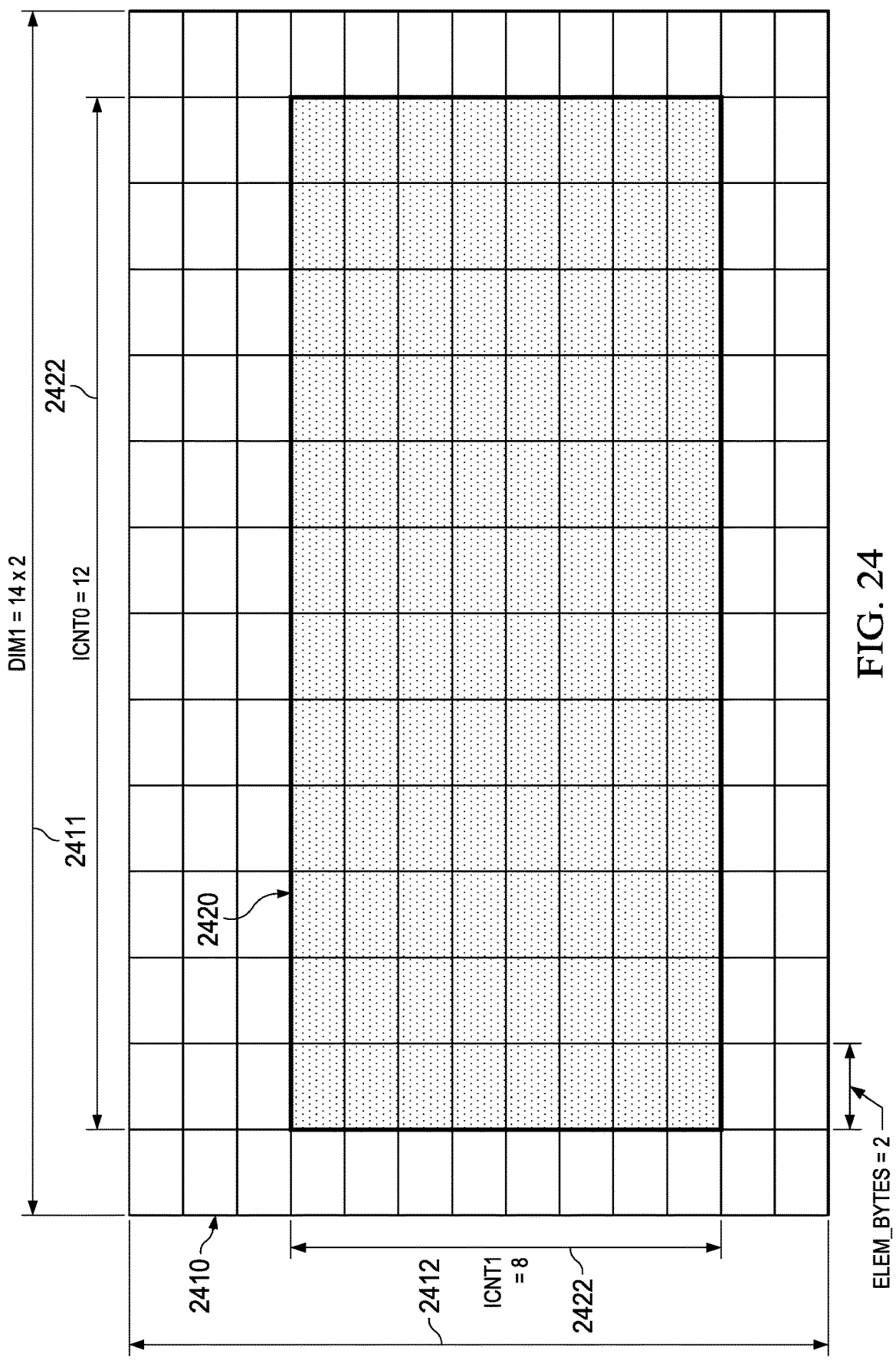
FIG. 24 illustrates extracting a smaller rectangle from a larger rectangle.

Transposed streams access along dimension 1 before dimension 0. The following examples illustrate a couple transposed streams, varying the transposition granularity. FIG. 24 illustrates extracting a smaller rectangle 2420 (12× 8) having dimensions 2421 and 2422 from a larger rectangle 2410 (14×13) having dimensions 2411 and 2412. In FIG. 24 ELEM_BYTES equals 2.

Figure 25:
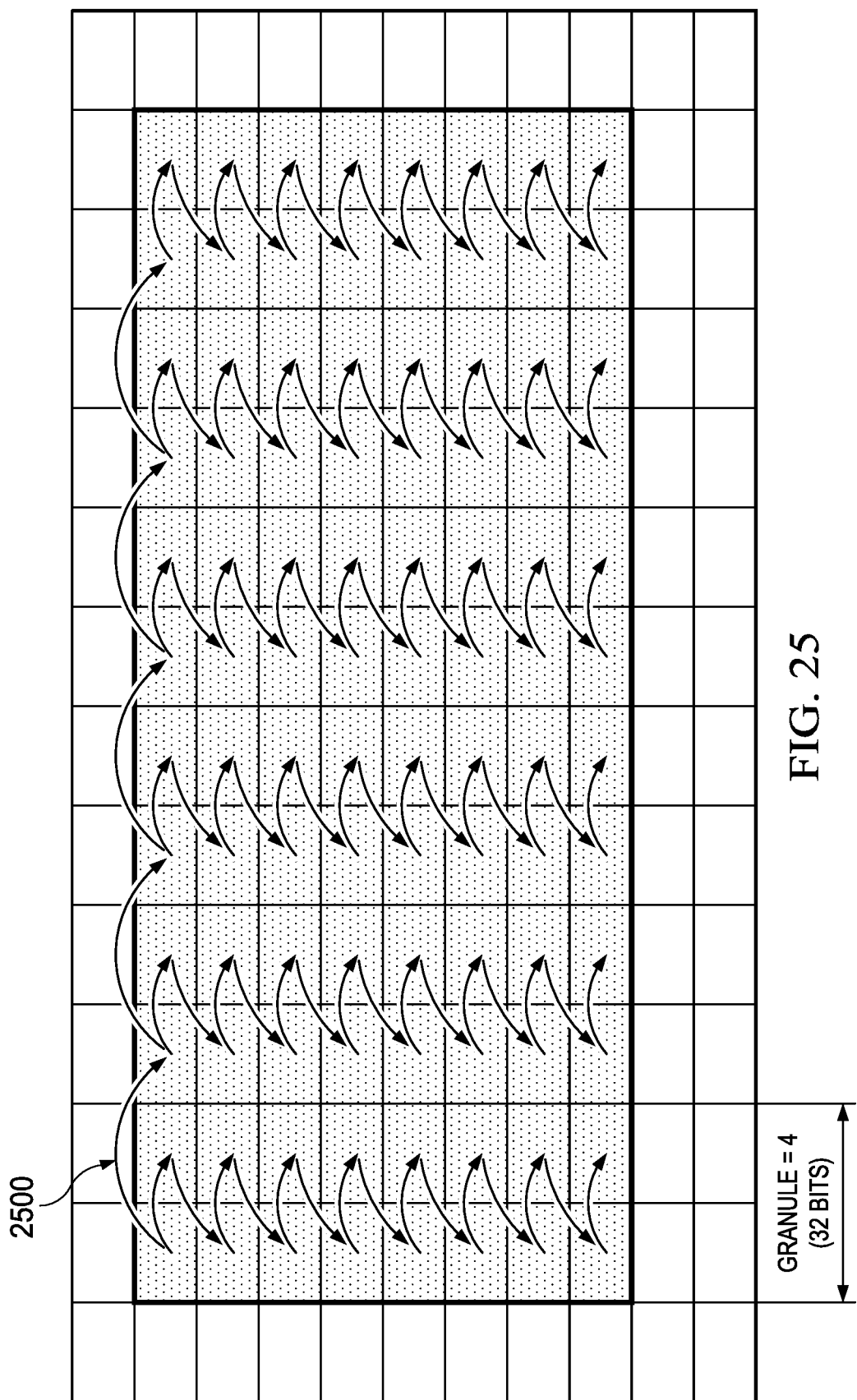
FIG. 25 illustrates how the streaming engine would fetch the stream of this example with a transposition granularity of 4 bytes.

FIG. 25 illustrates how the streaming engine would fetch the stream of this example with a transposition granularity of 4 bytes. Fetch pattern 2500 fetches pairs of elements from each row (because the granularity of 4 is twice the ELEM_BYTES of 2), but otherwise moves down the columns. Once it reaches the bottom of a pair of columns, it repeats this pattern with the next pair of columns.

Figure 26:
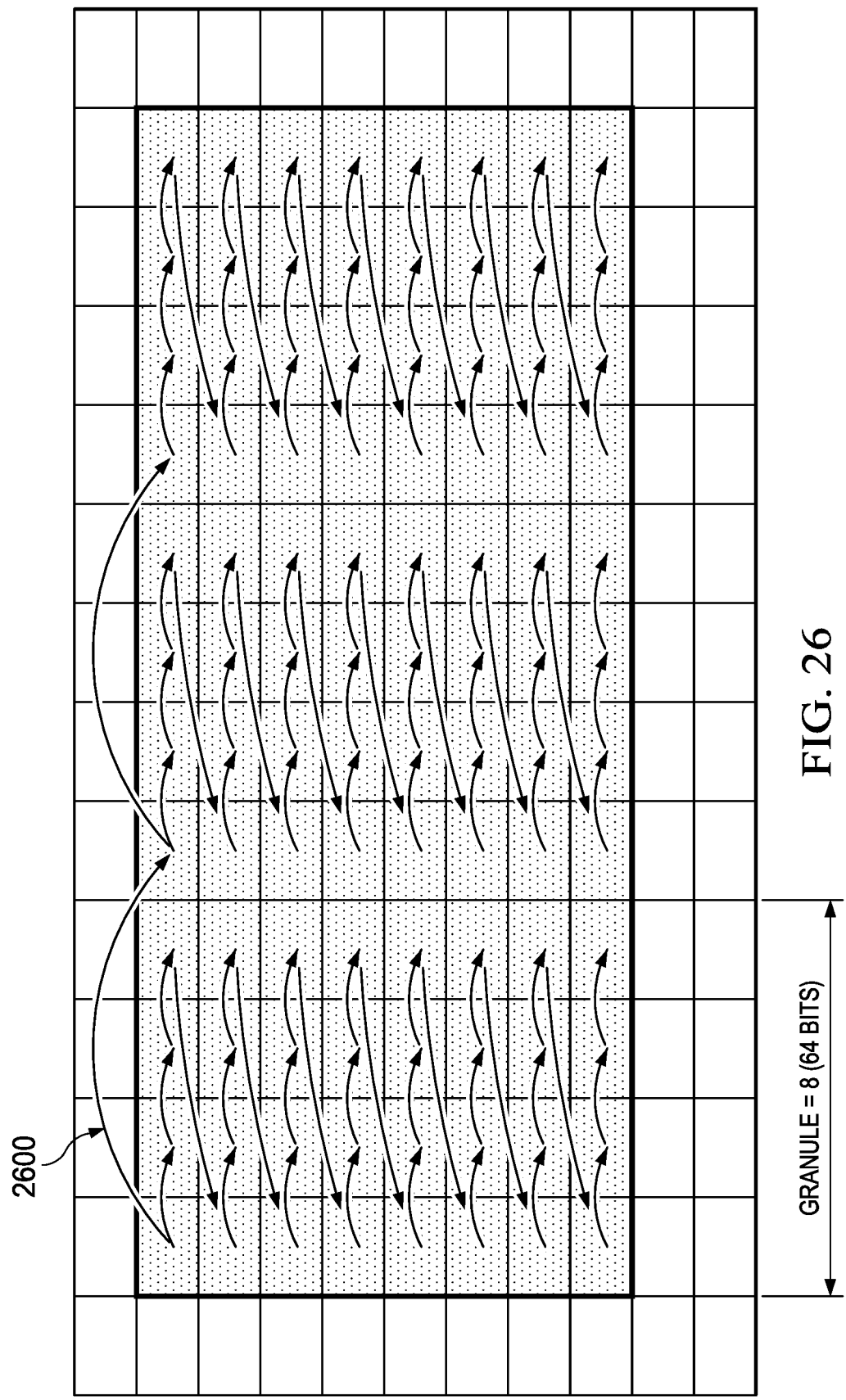
FIG. 26 illustrates how the streaming engine would fetch the stream of this example with a transposition granularity of 8 bytes.

FIG. 26 illustrates how the streaming engine would fetch the stream of this example with a transposition granularity of 8 bytes. The overall structure remains the same. The streaming engine fetches 4 elements from each row (because the granularity of 8 is four times the ELEM_BYTES of 2) before moving to the next row in the column as shown in fetch pattern 2600.

The streams examined so far read each element from memory exactly once. A stream can read a given element from memory multiple times, in effect looping over a piece of memory. FIR filters exhibit two common looping patterns. FIRs re-read the same filter taps for each output. FIRs also read input samples from a sliding window. Two consecutive outputs will need inputs from two overlapping windows.

Figure 27:
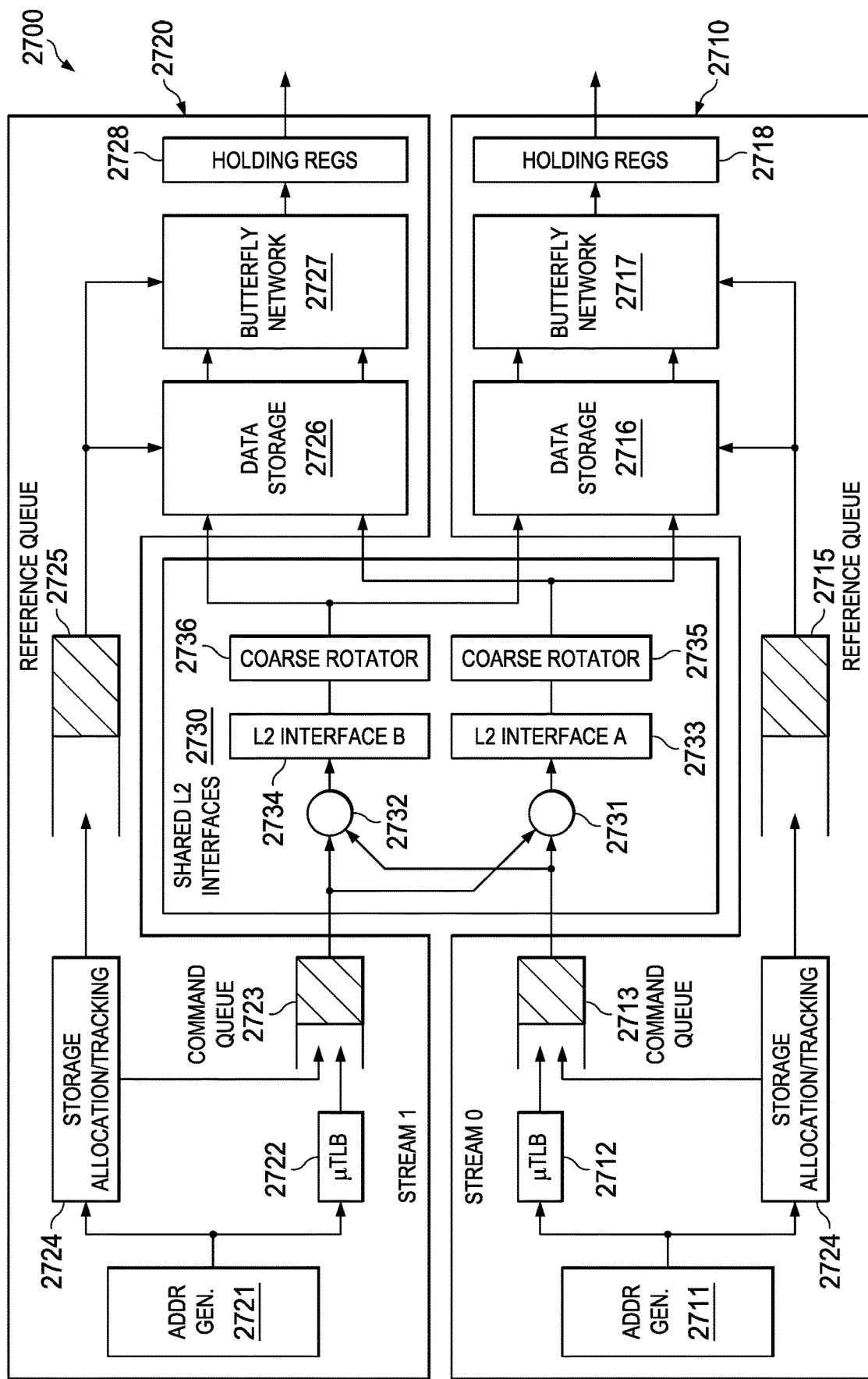
FIG. 27 illustrates the details of streaming engine of this invention.

FIG. 27 illustrates the details of streaming engine 2700. Streaming engine 2700 contains three major sections: Stream 0 2710; Stream 1 2720; and Shared L2 Interfaces 2730. Stream 0 2710 and Stream 1 2720 both contain identical hardware that operates in parallel. Stream 0 2710 and Stream 1 2720 both share L2 interfaces 2730. Each stream 2710 and 2720 provides central processing unit core 110 with up to 512 bits/cycle, every cycle. The streaming engine architecture enables this through its dedicated stream paths and shared dual L2 interfaces.

Each streaming engine 2700 includes a dedicated 4-dimensional stream address generator 2711/2721 that can each generate one new non-aligned request per cycle. Address generators 2711/2721 output 512-bit aligned addresses that overlap the elements in the sequence defined by the stream parameters. This will be further described below.

Each address generator 2711/2711 connects to a dedicated micro table look-aside buffer (µTLB) 2712/2722. The µTLB 2712/2722 converts a single 48-bit virtual address to a 44-bit physical address each cycle. Each µTLB 2712/2722 has 8 entries, covering a minimum of 32 kB with 4 kB pages or a maximum of 16 MB with 2 MB pages. Each address generator 2711/2721 generates 2 addresses per cycle. The µTLB 2712/2722 only translates 1 address per cycle. To maintain throughput, streaming engine 2700 takes advantage of the fact that most stream references will be within the same 4 kB page. Thus the address translation does not modify bits 0 to 11 of the address. If aout0 and aout1 line in the same 4 kB page (aout0[47:12] are the same aout1 [47:12]), then the µTLB 2712/2722 only translates aout0 and reuses the translation for the upper bits of both addresses.

Translated addresses are queued in command queue 2713/2723. These addresses are aligned with information from the corresponding Storage Allocation and Tracking block 2714/2724. Streaming engine 2700 does not explicitly manage µTLB 2712/2722. The system memory management unit (MMU) invalidates µTLBs as necessary during context switches.

Storage Allocation and Tracking 2714/2724 manages the stream's internal storage, discovering data reuse and tracking the lifetime of each piece of data. This will be further described below.

Reference queue 2715/2725 stores the sequence of references generated by the corresponding address generator 2711/2721. This information drives the data formatting network so that it can present data to central processing unit core 110 in the correct order. Each entry in reference queue 2715/2725 contains the information necessary to read data out of the data store and align it for central processing unit core 110. Reference queue 2715/2725 maintains the following information listed in Table 5 in each slot:

TABLE 5

| | |
|---|---|
| Data Slot Low | Slot number for the lower half of data associated with aout0 |
| Data Slot High | Slot number for the upper half of data associated with aout1 |
| Rotation | Number of bytes to rotate data to align next element with lane 0 |
| Length | Number of valid bytes in this reference |

Storage allocation and tracking 2714/2724 inserts references in reference queue 2715/2725 as address generator 2711/2721 generates new addresses. Storage allocation and tracking 2714/2724 removes references from reference queue 2715/2725 when the data becomes available and there is room in the stream holding registers. As storage allocation and tracking 2714/2724 removes slot references from reference queue 2715/2725 and formats data, it checks whether the references represent the last reference to the corresponding slots. Storage allocation and tracking 2714/2724 compares reference queue 2715/2725 removal pointer against the slot's recorded Last Reference. If they match, then storage allocation and tracking 2714/2724 marks the slot inactive once it's done with the data.

Streaming engine 2700 has data storage 2716/2726 for an arbitrary number of elements. Deep buffering allows the streaming engine to fetch far ahead in the stream, hiding memory system latency. The right amount of buffering might vary from product generation to generation. In the current preferred embodiment streaming engine 2700 dedicates 32 slots to each stream. Each slot holds 64 bytes of data.

Butterfly network 2717/2727 consists of a 7 stage butterfly network. Butterfly network 2717/2727 receives 128 bytes of input and generates 64 bytes of output. The first stage of the butterfly is actually a half-stage. It collects bytes from both slots that match a non-aligned fetch and merges them into a single, rotated 64-byte array. The remaining 6 stages form a standard butterfly network. Butterfly network 2717/2727 performs the following operations: rotates the next element down to byte lane 0; promotes data types by one power of 2, if requested; swaps real and imaginary components of complex numbers, if requested; converts big endian to little endian if central processing unit core 110 is presently in big endian mode. The user specifies element size, type promotion and real/imaginary swap as part of the stream's parameters.

Streaming engine 2700 attempts to fetch and format data ahead of central processing unit core 110's demand for it, so that it can maintain full throughput. Holding registers 2718/2728 provide a small amount of buffering so that the process remains fully pipelined. Holding registers 2718/2728 are not directly architecturally visible, except for the fact that streaming engine 2700 provides full throughput.

The two streams 2710/2720 share a pair of independent L2 interfaces 2730: L2 Interface A (IFA) 2733 and L2 Interface B (IFB) 2734. Each L2 interface provides 512 bits/cycle throughput direct to the L2 controller for an aggregate bandwidth of 1024 bits/cycle. The L2 interfaces use the credit-based multicore bus architecture (MBA) protocol. The L2 controller assigns each interface its own pool of command credits. The pool should have sufficient credits so that each interface can send sufficient requests to achieve full read-return bandwidth when reading L2 RAM, L2 cache and multicore shared memory controller (MSMC) RAM.

To maximize performance, both streams can use both L2 interfaces, allowing a single stream to send a peak command rate of 2 requests/cycle. Each interface prefers one stream over the other, but this preference changes dynamically from request to request. IFA 2733 and IFB 2734 always prefer opposite streams, when IFA 2733 prefers Stream 0, IFB 2734 prefers Stream 1 and vice versa.

Arbiter 2731/2732 ahead of each interface 2733/2734 applies the following basic protocol on every cycle it has credits available. Arbiter 2731/2732 checks if the preferred stream has a command ready to send. If so, arbiter 2731/2732 chooses that command. Arbiter 2731/2732 next checks if an alternate stream has at least two requests ready to send, or one command and no credits. If so, arbiter 2731/2732 pulls a command from the alternate stream. If either interface issues a command, the notion of preferred and alternate streams swap for the next request. Using this simple algorithm, the two interfaces dispatch requests as quickly as possible while retaining fairness between the two streams. The first rule ensures that each stream can send a request on every cycle that has available credits. The second rule provides a mechanism for one stream to borrow the other's interface when the second interface is idle. The third rule spreads the bandwidth demand for each stream across both interfaces, ensuring neither interface becomes a bottleneck by itself.

Coarse Grain Rotator 2735/2736 enables streaming engine 2700 to support a transposed matrix addressing mode. In this mode, streaming engine 2700 interchanges the two innermost dimensions of its multidimensional loop. This accesses an array column-wise rather than row-wise. Rotator 2735/2736 is not architecturally visible, except as enabling this transposed access mode.

The stream definition template provides the full structure of a stream that contains data. The iteration counts and dimensions provide most of the structure, while the various flags provide the rest of the details. For all data-containing streams, the streaming engine defines a single stream template. All stream types it supports fit this template. The numbers above each field indicate byte numbers within a 256-bit vector. The streaming engine defines a four-level loop nest for addressing elements within the stream. Most of the fields in the stream template map directly to the parameters in that algorithm. FIG. 28 illustrates stream template register 2800. The numbers above the fields are byte numbers within a 512-bit vector. Table 6 shows the stream field definitions of a stream template, which includes ICNT0 field (2810), ICNT1 field (2811), ICNT2 field (2812), ICNT3 field (2813), FLAGS field (2831), DIM1 field (2821), DIM2 field (2822), and DIM3 field (2823).

TABLE 6

| Field Name | Description | Size Bits |
|---|---|---|
| ICNT0 | Iteration count for loop 0 (innermost) | 32 |
| ICNT1 | Iteration count for loop 1 | 32 |
| ICNT2 | Iteration count for loop 2 | 32 |
| ICNT3 | Iteration count for loop 3 (outermost) | 8 |
| DIM1 | Signed dimension for loop 1 | 32 |
| DIM2 | Signed dimension for loop 2 | 32 |
| DIM3 | Signed dimension for loop 3 | 32 |
| FLAGS | Stream modifier flags | 24 |

In the current example DIM0 is always equal to is ELEM_BYTES defining physically contiguous data. The stream template includes mostly 32-bit fields. The stream template limits ICNT3 to 8 bits and the FLAGS field to 24 bits. Streaming engine 2700 interprets all iteration counts as unsigned integers and all dimensions as unscaled signed integers. The template above fully specifies the type of elements, length and dimensions of the stream. The stream instructions separately specify a start address. This would typically be by specification of a scalar register in scalar register file 211 which stores this start address. This allows a program to open multiple streams using the same template.

FIG. 29 illustrates sub-field definitions of the flags field 2900, which may correspond to field 2831 of FIG. 28. As shown in FIG. 29 the flags field 2900 is 3 bytes or 24 bits. FIG. 29 shows bit numbers of the fields. Table 7 shows the definition of these fields, which includes ELTYPE field (2901), DIR field (2902), TRANSPOSE field (2903), PROMOTE field (2904), and THROTTLE field (2905).

TABLE 7

| Field Name | Description | Size Bits |
|---|---|---|
| ELTYPE | Type of data element | 4 |
| DIR | Stream direction<br>0 forward direction<br>1 reverse direction | 1 |
| TRANSPOSE | Two dimensional transpose mode | 3 |
| PROMOTE | Promotion mode | 2 |
| THROTTLE | Fetch ahead throttle mode | 2 |

The Element Type (ELTYPE) field 2901 defines the data type of the elements in the stream. The coding of the four bits of this field is defined as shown in Table 8.

TABLE 8

| ELTYPE | Sub-element Size Bits | Total Element Size Bits | Real - Complex | Bytes/ Element |
|---|---|---|---|---|
| 0000 | 8 | 8 | real | 1 |
| 0001 | 16 | 16 | real | 2 |
| 0010 | 32 | 32 | real | 4 |
| 0011 | 64 | 64 | real | 8 |
| 0100 | | reserved | | |
| 0101 | | reserved | | |
| 0110 | | reserved | | |
| 0111 | | reserved | | |
| 1000 | 8 | 16 | complex no swap | 2 |
| 1001 | 16 | 32 | complex no swap | 4 |
| 1010 | 32 | 64 | complex no swap | 8 |
| 1011 | 64 | 128 | complex no swap | 16 |
| 1100 | 8 | 16 | complex swapped | 2 |
| 1101 | 16 | 32 | complex swapped | 4 |
| 1110 | 32 | 64 | complex swapped | 8 |
| 1111 | 64 | 128 | complex swapped | 16 |

Sub-Element Size determines the type for purposes of type promotion and vector lane width. For example, 16-bit sub-elements get promoted to 32-bit sub-elements when a stream requests type promotion. The vector lane width matters when central processing unit core 110 operates in big endian mode, as it always lays out vectors in little endian order.

Total Element Size determines the minimal granularity of the stream. In the stream addressing model, it determines the number of bytes the stream fetches for each iteration of the innermost loop. Streams always read whole elements, either in increasing or decreasing order. Therefore, the innermost dimension of a stream spans ICNT0×total-element-size bytes.

Real-Complex Type determines whether the streaming engine treats each element as a real number or two parts (real/imaginary or magnitude/angle) of a complex number. This field also specifies whether to swap the two parts of complex numbers. Complex types have a total element size that is twice their sub-element size. Otherwise, the sub-element size equals total element size.

The DIR bit 2902 determines the direction of fetch of the inner loop (Loop0). If the DIR bit 2902 is 0 then Loop0 fetches are in the forward direction toward increasing addresses. inner loop (Loop0). If the DIR bit 2902 is 1 then Loop0 fetches are in the backward direction toward decreasing addresses.

The TRANSPOSE field 2903 determines whether the streaming engine accesses the stream in a transposed order. The transposed order exchanges the inner two addressing levels. The TRANSPOSE field also indicated the granularity it transposes the stream. The coding of the four bits of this field is defined as shown in Table 9.

TABLE 9

| TRANSPOSE | Transpose Duplication | Granule Bytes | Stream Advance Rate |
|---|---|---|---|
| 0000 | both disabled | | 64 bytes |
| 0001 | | reserved | |
| 0010 | | reserved | |
| 0011 | transpose | 4 | 16 rows |
| 0100 | transpose | 8 | 8 rows |
| 0101 | transpose | 16 | 4 rows |
| 0110 | transpose | 32 | 2 rows |
| 0111 | | reserved | |
| 1000 | duplicate | 1 | 1 byte |
| 1001 | duplicate | 2 | 2 bytes |
| 1010 | duplicate | 4 | 4 bytes |
| 1011 | duplicate | 8 | 8 bytes |
| 1100 | duplicate | 16 | 16 bytes |
| 1101 | duplicate | 32 | 32 bytes |
| 1110 | | reserved | |
| 1111 | | reserved | |

Streaming engine 2700 actually transposes at a different granularity than the element size. This allows programs to fetch multiple columns of elements from each row. The transpose granularity must be no smaller than the element size.

The PROMOTE field 2904 controls whether the streaming engine promotes sub-elements in the stream and the type of promotion. When enabled, streaming engine 2700 promotes types by a single power-of-2 size. The coding of the two bits of this field is defined as shown in Table 10.

TABLE 10

| PROMOTE | Description |
|---|---|
| 00 | no promotion |
| 01 | unsigned integer promotion, zero extend |
| 10 | signed integer promotion, sign extend |
| 11 | floating point promotion |

When the stream specifies No promotion, each sub-element occupies a vector lane equal in width to the size specified by ELTYPE. Otherwise, each sub-element occupies a vector lane twice as large. When PROMOTE is 00, the streaming engine fetches half as much data from memory to satisfy the same number of stream fetches.

Promotion modes 01b and 10b treat the incoming sub-elements as unsigned and signed integers, respectively. For unsigned integers, the streaming engine promotes by filling the new bits with zeros. For signed integers the streaming engine promotes by filling the new bits with copies of the sign bit. Positive signed integers have a most significant bit equal to 0. On promotion of positive signed integers, the new bits are zero filled. Negative signed integers have a most significant bit equal to 1. On promotion of negative signed integers, the new bits are 1 filled.

Promotion mode 11b treats the incoming sub-elements as floating point numbers. Floating point promotion treats each sub-element as a floating point type. The streaming engine supports two floating point promotions: short float (16-bit) to single precision float (32-bit); single precision float (32-bit) to double precision float (64-bit).

The THROTTLE field 2905 controls how aggressively the streaming engine fetches ahead of central processing unit core 110. The coding of the two bits of this field is defined as shown in Table 11.

TABLE 11

| THROTTLE | Description |
|---|---|
| 00 | Minimum throttling, maximum fetch ahead |
| 01 | Less throttling, more fetch ahead |
| 10 | More throttling, less fetch ahead |
| 11 | Maximum throttling, minimum fetch ahead |

THROTTLE does not change the meaning of the stream, and serves only as a hint. The streaming engine may ignore this field. Programs should not rely on the specific throttle behavior for program correctness, because the architecture does not specify the precise throttle behavior. THROTTLE allows programmers to provide hints to the hardware about the program's own behavior. By default, the streaming engine attempts to get as far ahead of central processing unit core 110 as it can to hide as much latency as possible, while providing full stream throughput to central processing unit core 110. While several key applications need this level of throughput, it can lead to bad system level behavior for others. For example, the streaming engine discards all fetched data across context switches. Therefore, aggressive fetch-ahead can lead to wasted bandwidth in a system with large numbers of context switches. Aggressive fetch-ahead only makes sense in those systems if central processing unit core 110 consumes data very quickly.

The central processing unit core 110 exposes the streaming engine to programs through a small number of instructions and specialized registers. A STROPEN instruction opens a stream. The STROPEN command specifies a stream number indicating opening stream 0 or stream 1. The STROPEN specifies a stream template register which stores the stream template as described above. The arguments of the STROPEN instruction are listed in Table 12.

TABLE 12

| Argument | Description |
|---|---|
| Stream Start Address Register | Scaler register storing stream start address |
| Steam Number | Stream 0 or Stream 1 |

TABLE 12-continued

| Argument | Description |
| --- | --- |
| Stream Template Register | Vector register storing stream template data |

The stream start address register is preferably a scalar register in general scalar register file 211. The STROPEN instruction specifies stream 0 or stream 1 by its opcode. The stream template register is preferably a vector register in general vector register file 221. If the specified stream is active the STROPEN instruction closes the prior stream and replaces the stream with the specified stream.

A STRCLOSE instruction closes a stream. The STRCLOSE command specifies the stream number of the stream to be closed.

A STRSAVE instruction captures sufficient state information of a specified stream to restart that stream in the future. A STRRSTR instruction restores a previously saved stream. A STRSAVE instruction does not save any of the data of the stream. A STRSAVE instruction saves only metadata. The stream re-fetches data in response to a STRRSTR instruction.

Streaming engine is in one of three states: Inactive; Active; or Frozen. When inactive the streaming engine does nothing. Any attempt to fetch data from an inactive streaming engine is an error. Until the program opens a stream, the streaming engine is inactive. After the program consumes all the elements in the stream or the program closes the stream, the streaming engine also becomes inactive. Programs which use streams explicitly activate and inactivate the streaming engine. The operating environment manages streams across context-switch boundaries via the streaming engine's implicit freeze behavior, coupled with its own explicit save and restore actions.

Active streaming engines have a stream associated with them. Programs can fetch new stream elements from active streaming engines. Streaming engines remain active until one of the following. When the stream fetches the last element from the stream, it becomes inactive. When program explicitly closes the stream, it becomes inactive. When central processing unit core 110 responds to an interrupt or exception, the streaming engine freezes. Frozen streaming engines capture all the state necessary to resume the stream where it was when the streaming engine froze. The streaming engines freeze in response to interrupts and exceptions. This combines with special instructions to save and restore the frozen stream context, so that operating environments can cleanly switch contexts. Frozen streams reactivate when central processing unit core 110 returns to the interrupted context.

Figure 30:
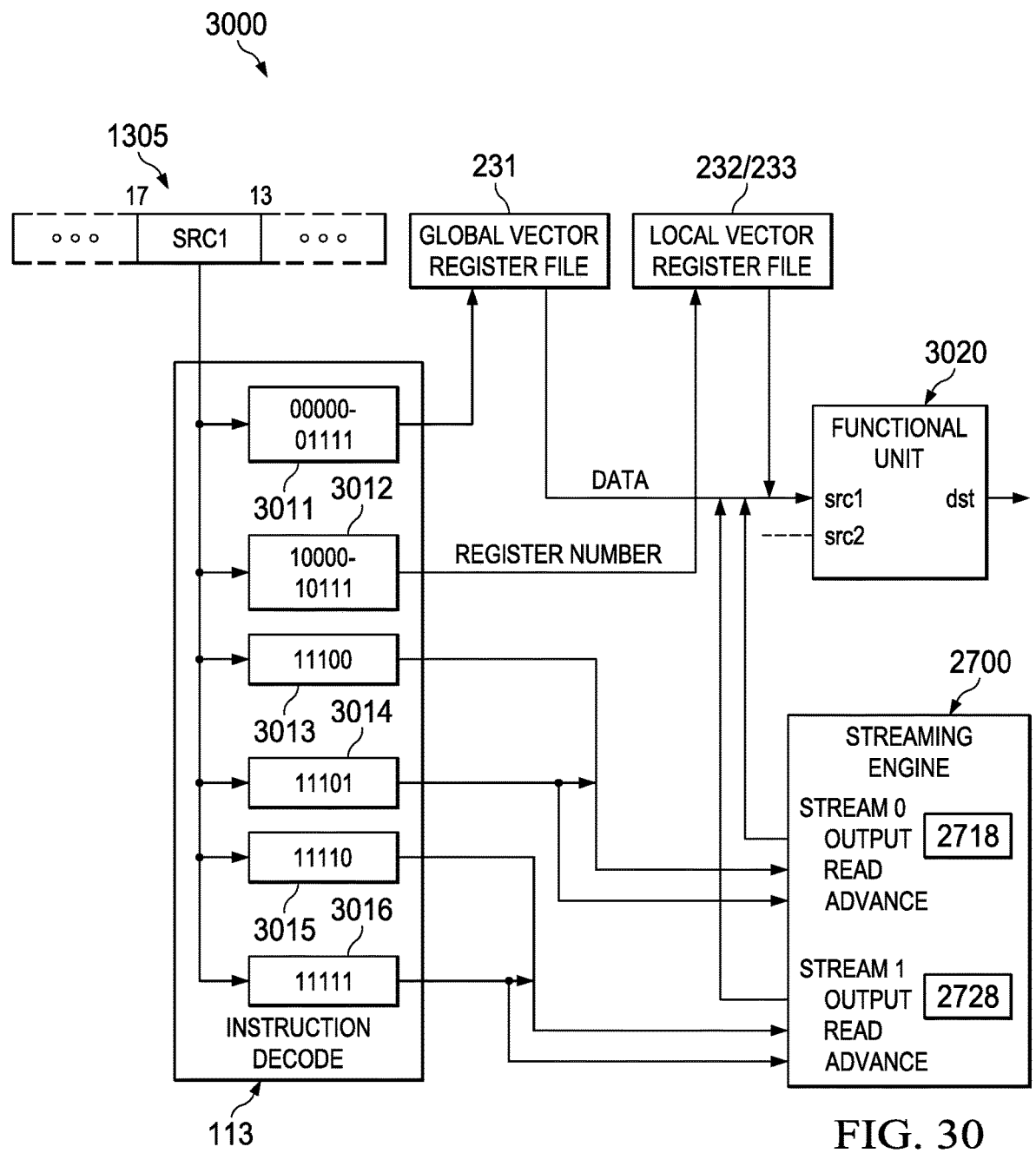
FIG. 30 illustrates a partial schematic diagram showing the streaming engine supply of data of this invention.

FIG. 30 is a partial schematic diagram 3000 illustrating the stream input operand coding described above. FIG. 30 illustrates decoding src1 field 1305 of one instruction of a corresponding src1 input of functional unit 3020. These same circuits are duplicated for src2/cst field 1304 and the src2 input of functional unit 3020. In addition, these circuits are duplicated for each instruction within an execute packet that can be dispatched simultaneously.

Instruction decoder 113 receives bits 13 to 17 comprising src1 field 1305 of an instruction. The opcode field opcode field (bits 4 to 12 for all instructions and additionally bits 28 to 31 for unconditional instructions) unambiguously specifies a corresponding functional unit 3020. In this embodiment functional unit 3020 could be L2 unit 241, S2 unit 242, M2 unit 243, N2 unit 244 or C unit 245. The relevant part of instruction decoder 113 illustrated in FIG. 30 decodes src1 bit field 1305. Sub-decoder 3011 determines whether src1 bit field 1305 is in the range from 00000 to 01111. If this is the case, sub-decoder 3011 supplies a corresponding register number to global vector register file 231. In this example this register field is the four least significant bits of src1 bit field 1305. Global vector register file 231 recalls data stored in the register corresponding to this register number and supplies this data to the src1 input of functional unit 3020. This decoding is generally known in the art.

Sub-decoder 3012 determines whether src1 bit field 1305 is in the range from 10000 to 10111. If this is the case, sub-decoder 3012 supplies a corresponding register number to the corresponding local vector register file. If the instruction is directed to L2 unit 241 or S2 unit 242, the corresponding local vector register file is local vector register field 232. If the instruction is directed to M2 unit 243, N2 unit 244 or C unit 245, the corresponding local vector register file is local vector register field 233. In this example this register field is the three least significant bits of src1 bit field 1305. Local vector register file 231 recalls data stored in the register corresponding to this register number and supplies this data to the src1 input of functional unit 3020. The corresponding local vector register file 232/233 recalls data stored in the register corresponding to this register number and supplies this data to the src1 input of functional unit 3020. This decoding is generally known in the art.

Sub-decoder 3013 determines whether src1 bit field 1305 is 11100. If this is the case, sub-decoder 3013 supplies a stream 0 read signal to streaming engine 2700. Streaming engine 2700 then supplies stream 0 data stored in holding register 2718 to the src1 input of functional unit 3020.

Sub-decoder 3014 determines whether src1 bit field 1305 is 11101. If this is the case, sub-decoder 3014 supplies a stream 0 read signal to streaming engine 2700. Streaming engine 2700 then supplies stream 0 data stored in holding register 2718 to the src1 input of functional unit 3020. Sub-decoder 3014 also supplies an advance signal to stream 0. As previously described, streaming engine 2700 advances to store the next sequential data elements of stream 0 in holding register 2718.

Sub-decoder 3015 determines whether src1 bit field 1305 is 11110. If this is the case, sub-decoder 3015 supplies a stream 1 read signal to streaming engine 2700. Streaming engine 2700 then supplies stream 1 data stored in holding register 2728 to the src1 input of functional unit 3020.

Sub-decoder 3016 determines whether src1 bit field 1305 is 11111. If this is the case, sub-decoder 3016 supplies a stream 1 read signal to streaming engine 2700. Streaming engine 2700 then supplies stream 1 data stored in holding register 2728 to the src1 input of functional unit 3020. Sub-decoder 3014 also supplies an advance signal to stream 1. As previously described, streaming engine 2700 advances to store the next sequential data elements of stream 2 in holding register 2728.

Similar circuits are used to select data supplied to scr2 input of functional unit 3002 in response to the bit coding of src2/cst field 1304. The src2 input of functional unit 3020 may be supplied with a constant input in a manner described above.

The exact number of instruction bits devoted to operand specification and the number of data registers and streams are design choices. Those skilled in the art would realize that other number selections that described in the application are feasible. In particular, the specification of a single global vector register file and omission of local vector register files is feasible. This invention employs a bit coding of an input operand selection field to designate a stream read and another bit coding to designate a stream read and advancing the stream.

Figure 31:
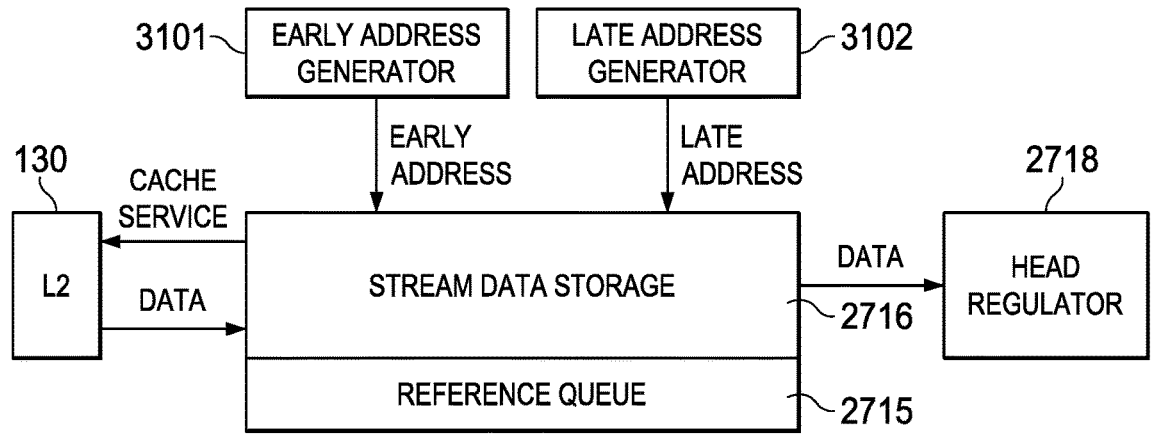
FIG. 31 illustrates a conceptual view of an embodiment of storing the data stream.

FIG. 31 is a partial block diagram illustrating the components supporting cache storage of fetched stream data for stream 0. The components for stream 1 are similar. Data storage 2716 is conceptually a data first-in-first-out (FIFO) buffers. In the preferred embodiment this FIFO is implemented in a cache fashion as detailed below.

Early address generator 3101 generates the address of a memory fetch. Late address generator 3102 generates the address of the next element(s) to be loaded into the stream head register 2718. Stream data storage 2716 buffers stream data between its fetch from memory and supply to the functional units of central processing unit core 110. Data movement is controlled with regard to data stored in reference queue 2515.

Figure 32:
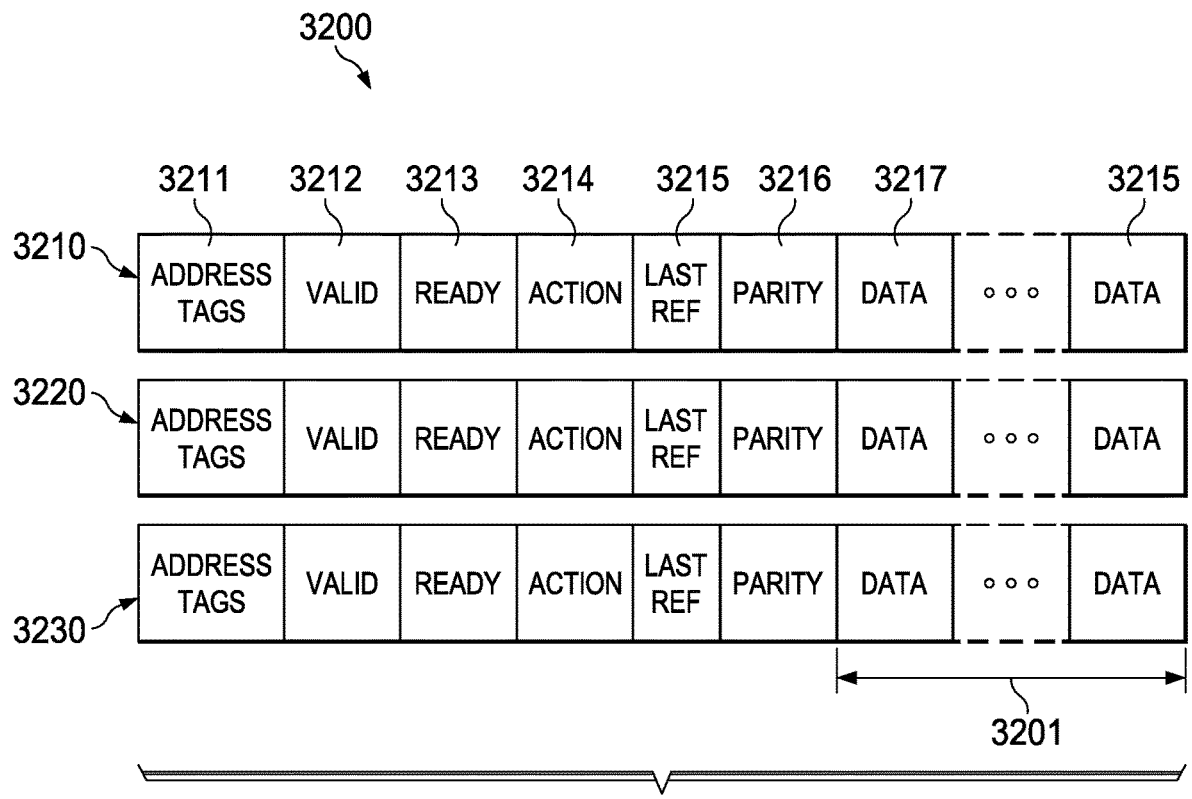
FIG. 32 illustrates the details of the cache construction of the data buffer in the streaming engine (Prior Art)

FIG. 32 illustrates the details of plural cache lines used in stream data storage 2716. Cache structure 3200 includes cache lines 3210, 3220 and 3220 representative of the internal structure. Cache lines 3210, 3220 and 3230 include: address tags 3211; valid bits 3212; ready bits 3213; action bits 3214; least recently used (LRU) indicators 3215; and plural data words 3216. The bit length of data words 3216 is set by the minimal addressable data amount of central processing unit core 110. This is typically 8 bits/1 byte.

Cache structure 3200 stores data from more distant memories which are accessed by a multi-bit address. Cache structure 3200 is organized to facilitate this storage and to facilitate finding such data in the cache. Each cache line 3210, 3220 and 3230 typically stores $2^N$ respective data words 3216, where N is an integer. Address tags 3211 includes the most significant address bits for the corresponding cache line 3210, 3220 and 3230. The position of data words 3216 within the corresponding cache line 3210, 3220 and 3230 along the dimension 3201 serves as a proxy for the least significant bits of the corresponding address.

To determine if a memory access is to data cached within cache structure 3200 (a cache hit), cache structure 3200 compares the address tags 3211 for all cache lines to the most significant bits of the memory location accessed. Upon a detecting a match, the position within the cache line along dimension 3201 corresponds to the least significant bits of the address permitting identification of the data word accessed.

Table 13 notes the character of the valid, ready, active and last reference fields.

TABLE 13

| | |
|---|---|
| Valid | Single bit indicating whether the tag address is valid |
| Ready | Single bit indicating the data has arrived for this address |
| Active | Single bit indicating whether there are any references outstanding to this data |
| Last Reference | Value indicating the most recent reference to this slot in the reference queue |

Each cache line 3210, 3220 and 3230 includes a corresponding valid bit 3212. A first state of valid bit 3212 indicates the corresponding data words 3216 of that cache line are valid. An opposite state of this valid bit indicates the corresponding data words 3216 are not valid. There are several instances where data stored within cache structure 3200 would not be valid. Upon initial activation of digital signal processor system 100 cache structure 3200 would not be loaded. Thus cache structure 3200 would not store valid data. Accordingly, all cache lines are initially marked invalid. During a cache access a comparison of a requested address with address tags 3211 would not detect a match unless the corresponding valid bit 3212 indicated the data was valid.

Each cache line 3210, 3220 and 3230 includes a corresponding ready bit 3213. A first state of ready bit 3213 indicates that no data for the corresponding cache line has arrived. A second state of the ready bit 3213 indicates that fetched data for this cache line has arrived.

Each cache line 3210, 3220 and 3230 includes a corresponding active bit 3214. A first state of active bit 3214 indicates that no reference to data for the corresponding cache line is pending. A second state of the active bit 3214 indicates that no reference to data for this cache line is pending.

Each cache line 3210, 3220 and 3230 includes a corresponding last reference field 3215. Last reference field 3215 typically is plural bits. Last reference field 3215 indicates the most recent reference to this slot in the reference queue. As described in further detail below, this information is used for allocation of cache lines.

Cache structure 3200 includes no corresponding dirty bits. According to the structure of the data stream, data stored in cache structure 3200 cannot be changed. Cache structure 3200 is used only for read accesses. Data stored within cache structure 3200 is thus never dirty. Accordingly, there is no need for dirty bits.

Table 14 details the interaction of the valid, ready and active bits.

TABLE 14

| Valid | Ready | Active | Interpretation | Available for Allocation |
|---|---|---|---|---|
| 0 | — | — | Address invalid | Yes |
| 1 | 0 | 0 | Invalid, cannot have data pending without reference in flight | — |
| 1 | 0 | 1 | Request sent for slot, data pending | No |
| 1 | 1 | 0 | No active references in flight | Yes |
| 1 | 1 | 1 | Reference in flight, data available | No |

Using this metadata, the storage allocation and tracking 2714/2724 can identify data reuse opportunities in the stream. Storage allocation and tracking 2714/2724 performs the following steps for each address. It compares the address against the relevant tags in its tag array. On a hit, it cancels the command associated with this address. On a miss, it allocates a free slot, setting Valid=1, Ready=0 and updates the outgoing command to direct the data it is fetching to this slot. In either case, a slot number is associated with the address. Storage allocation and tracking 2714/2724 inserts the reference in the reference queue. Storage allocation and tracking 2714/2724 sets Active=1 and updates Last Reference to the position of the reference in the reference queue. This is the value of the reference queue's insertion pointer at the time of insertion. This process converts the generated addresses into the slot numbers that represent the data. From this point forward, the streaming engine need not track addresses directly.

To maximize reuse and minimize stalls, streaming engine 2700 allocates slots in the following order: the slot one after the most recent allocation if available in FIFO order; the lowest number available slot, if any; and if no slot available, stall and iterate these two steps until allocation succeeds. This will tend to allocate slots in FIFO order, but avoids stalling if a particular reuse pattern works against that order.

Figure 33:
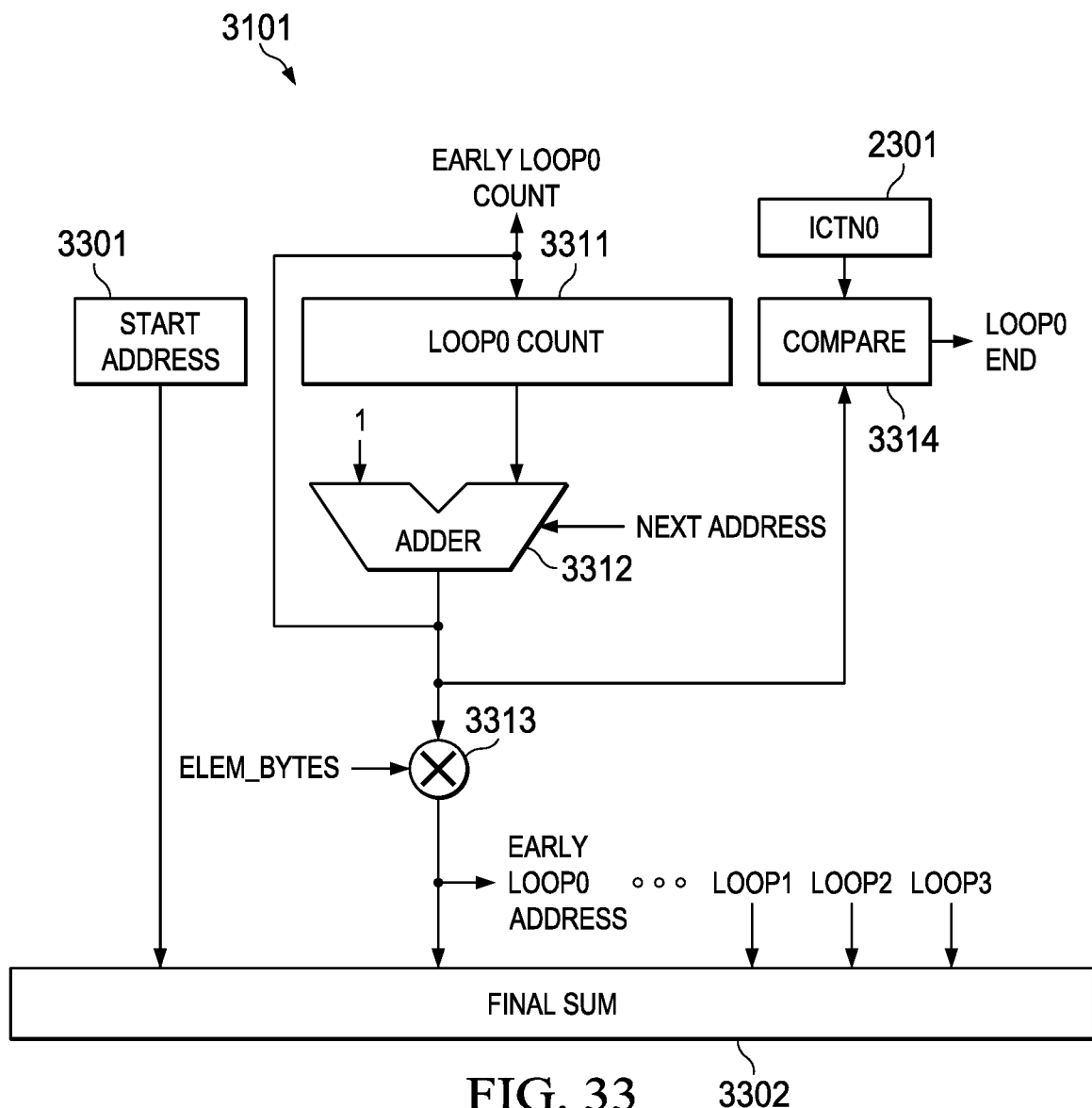
FIG. 33 is a partial schematic diagram illustrating generation of the early address and early loop count for loop 0.

FIG. 33 illustrates a partial schematic view of an early address generator 3101. Early address generator 3101 forms an address for fetching a next element in the defined stream of the corresponding streaming engine. Start address register 3301 stores a start address of the data stream. As previously described, start address register 3301 is preferably a scalar register in global scalar register file 211 designated by the STROPEN instruction that opened the corresponding stream. As known in the art, this start address may be copied from the specified scalar register and stored locally at the corresponding address generator 2711 OR 2721. A first loop of the stream employs Loop 0 count register 3311, adder 3312, multiplier 3313 and comparator 3314. Loop 0 count register 3311 stores the working copy of the iteration count of the first loop (Loop0). For each iteration of Loop 0 adder 3312, as triggered by the Next Address signal, adds 1 to the loop count, which is stored back in Loop 0 count register 3311. Multiplier 3313 multiplies the current loop count and the quantity ELEM_BYTES. ELEM_BYTES is the size of each data element in the loop in bytes. Loop 0 traverses data elements physically contiguous in memory of the iteration step size is ELEM_BYTES.

Comparator 3314 compares the count stored in Loop0 count register 3311 (after incrementing by adder 3313) with the value of ICNT0 2810 from the corresponding stream template register 2800. When the output of adder 3312 equals the value of ICNT0 2810 of the stream template register 2800, an iteration of Loop0 is complete. Comparator 3314 generates an active Loop0 End signal. Loop0 count register 3311 is reset to 0 and an iteration of the next higher loop, in this case Loop1, is triggered.

Circuits for the higher loops (Loop1, Loop2, Loop3) are similar to that illustrated in FIG. 33. Each loop includes a corresponding working loop count register, adder, multiplier and comparator. The adder of each loop is triggered by the loop end signal of the prior loop. The second input to each multiplier is the corresponding dimension DIM1, DIM2 and DIM3 of the corresponding stream template. The comparator of each loop compares the working loop register count with the corresponding iteration value ICNT1, ICNT2 and ICNT3 of the corresponding stream template register 2800. A loop end signal generates an iteration of the next higher loop. A loop end signal from Loop3 ends the stream.

FIG. 33 illustrates the generation of early loop0 count. Early loop0 count equals the updated data stored in the corresponding working count register 3311. Early loop0 count is updated on each change of working loop0 count register 3311. The early loop counts for the higher loops (Loop1, Loop2, Loop3) are similarly generated.

FIG. 33 illustrates the generation of early loop0 address. Early loop0 address equals the data output from multiplier 3313. Early loop0 address is updated on each change of working loop0 count register 3311. Similar circuits for Loop1, Loop2 and Loop3 produce corresponding early loop addresses.

Figure 34A:
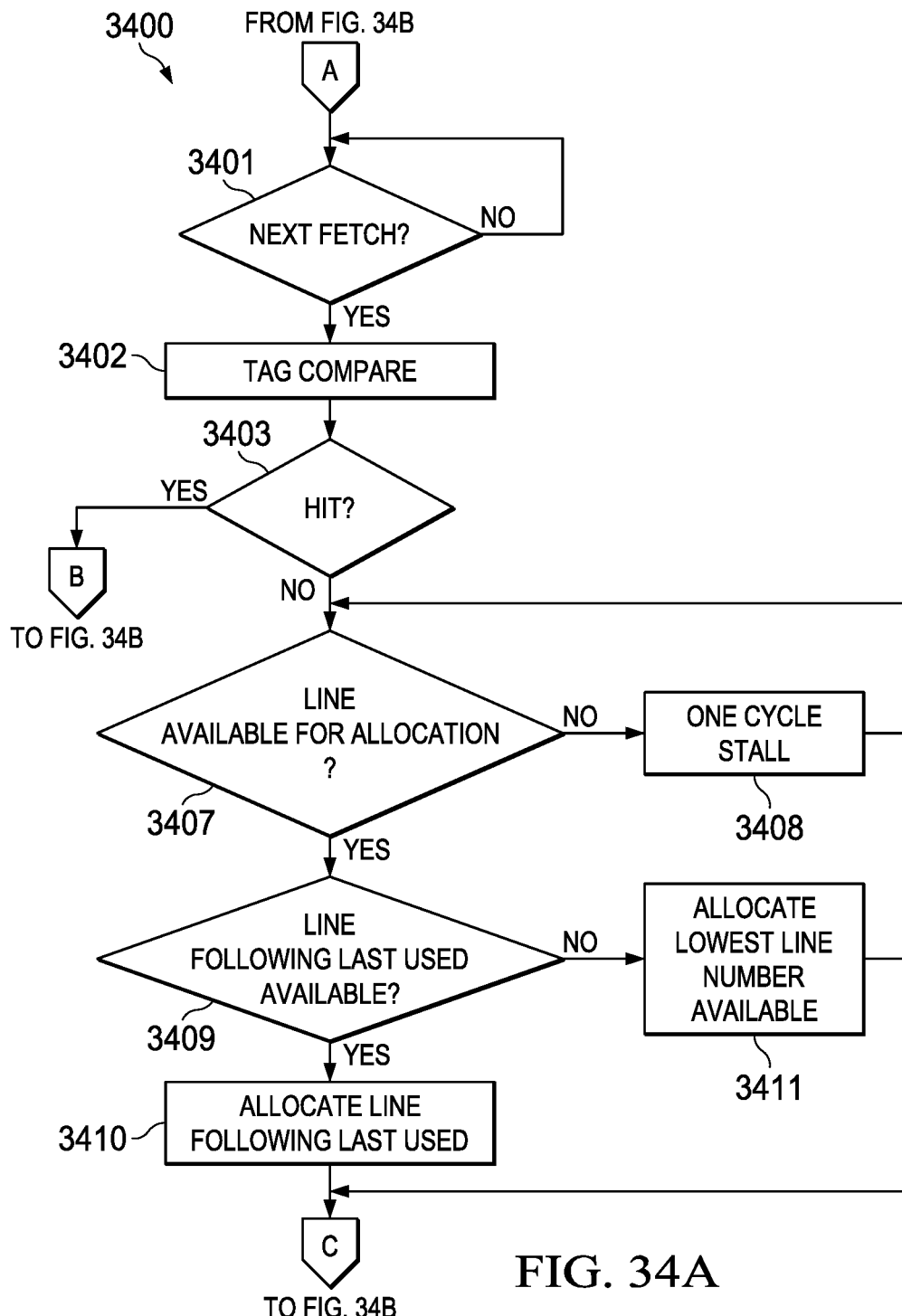
FIGS. 34A and 34B together are a flow chart illustrating the operation of the early address generator.
Figure 34B:
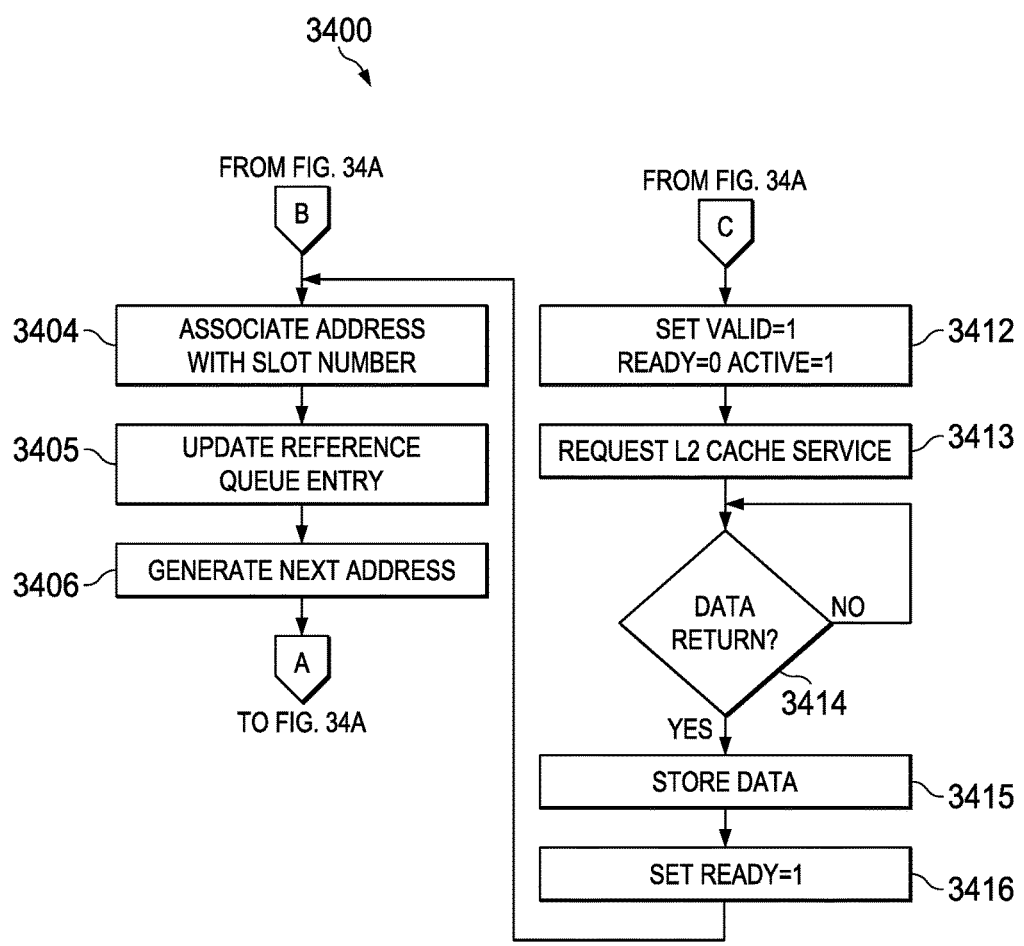

FIGS. 34A and 34B are together a flow chart 3400 illustrating the manner of data fetch for a stream employing the early address generator 3101. Flow chart 3400 begins at entry point A to test block 3401. Test block 3401 determines whether a next fetch from memory is required. The preferred manner of determining this is detailed below. If test block 3401 determines no memory fetch is required (No at test block 3401), the flow loops back to test block 3401 for another determination. Flow remains at test block 3401 until a memory fetch is required (Yes at test block 3401).

When a memory fetch is required (Yes at test block 3401), block 3402 performs a tag compare. The most significant bits of the next fetch address are compared with the address tags 3211 of each of the cache lines in stream data storage 2716. As previously described a match is not confirmed unless the corresponding valid bit 3212 indicates valid.

Test block 3403 determines if the address compare of block 3402 found a match (hit). If test block 3403 determined a match (hit) (Yes at test block 3402), then flow advances to block 3404. Block 3404 associates the current fetch address with the cache line/slot number generating the hit. Upon a hit, the stream data for the current fetch address is already stored in stream data storage 2717. Block 3155 updates the reference queue. The corresponding reference queue 2715 or 2725 stores data indicating the location of data within the cache. As previously described this data stored in the reference queue permits recall and alignment with the vector in the corresponding head register 2718/2728.

Block 3406 generates the next address in the stream. This will generally be the next element in loop0. However the current stream element may have been the end of one of the nested loops. The next address is generated according to the specified stream data pattern in a manner previously described. Flow returns to test block 3401 via entry point A.

In the case of a miss (No at test block 3403), the data corresponding to the current fetch address is not stored in the corresponding stream data storage 2616 or 2726. The process 3400 attempts to allocate a new cache line to the current fetch address. Test block 3407 determines if a cache line is available for allocation. As will be described below, an unused cache line may not be available for allocation. Once allocated a cache line is only deallocated by consumption of all the stream data stored in that cache line via central processing unit core 110 reads from the corresponding head register 2718/2728. Due to the nature of the data stream, all previously allocated cache lines store data to be used by central processing unit core 110 before data corresponding to the current fetch address. Thus cache lines are not evicted because they store data needed before the current data. Accordingly, a cache line cannot be allocated until all the stream data stored in that cache line is consumed by central processing unit core 110. As detailed below such data consumption is a necessary but not sufficient condition for the cache line to be re-allocated. If no cache line is available for allocation (No at test block 3407), block 3408 stalls the flow for one memory cycle. Process remains in this loop until at least one cache line is available for allocation (Yes at test block 3407).

If at least one cache line is available for allocation (Yes at test block 3407), then test block 3409 determines if the cache line following the last used cache line is available for allocation. If this cache line is available for allocation (Yes at test block 3409), then block 3410 allocates this cache line. If this cache line is not available for allocation (No at test block 3409), then block 3411 allocates the lowest cache line available. The preferred pattern of allocation is in first-in-first-out (FIFO) order. Thus the preferred cache line to allocate is the cache line following the last used cache line. Thus the active data would tend to rotate within the cache lines with allocation following consumption by central processing unit core 110. This allocation pattern tends to allocate slots in FIFO order. The allocation pattern described above (allocating the lowest cache line available if the cache line following the last use cache line is unavailable) avoids stalling if a particular data reuse pattern works against this FIFO order.

Upon allocation of a cache line for the current fetch address, flow advances to block 3412. Block 3412 sets the valid bit to 1, the ready bit to 0 and the active bit to 1 of the just allocate cache line. This indicates that the just allocated cache line is valid, not ready and data is in flight to the cache line. Next block 3413 requests cache service for the just allocated cache line. In the preferred embodiment of this invention stream data bypasses L1D cache 123 and requests the data directly from L2 cache 130. This design choice prevents stream data from interfering with other data used by central processing unit core 110.

Test block 3414 waits for the data to be returned to stream data storage 2716. The delay for return of the data is unknown and variable. This newly fetched data may be stored in L2 cache 130 and available quickly. This data might not be stored in L2 cache 130 and thus must be fetched from another level of memory. This other level of memory may be shared between several requesters. In this event there is generally an arbitration between requesters for access. Accordingly the memory latency is both unknown and variable.

Upon return of the requested data (Yes at test block 3414), block 3415 stores this data in the allocated cache line. Block 3416 changes the corresponding ready bit to 1, indicating the data is ready for consumption.

Process flow advances to block 3404. Block 3404 associates the current fetch address with the cache line/slot number generating the hit. Block 3405 updates the reference queue. The corresponding reference queue 2715 or 2725 stores data indicating the location of data within the cache. Block 3406 generates the next address in the stream. Flow returns to test block 3401 via entry point A.

Figure 35:
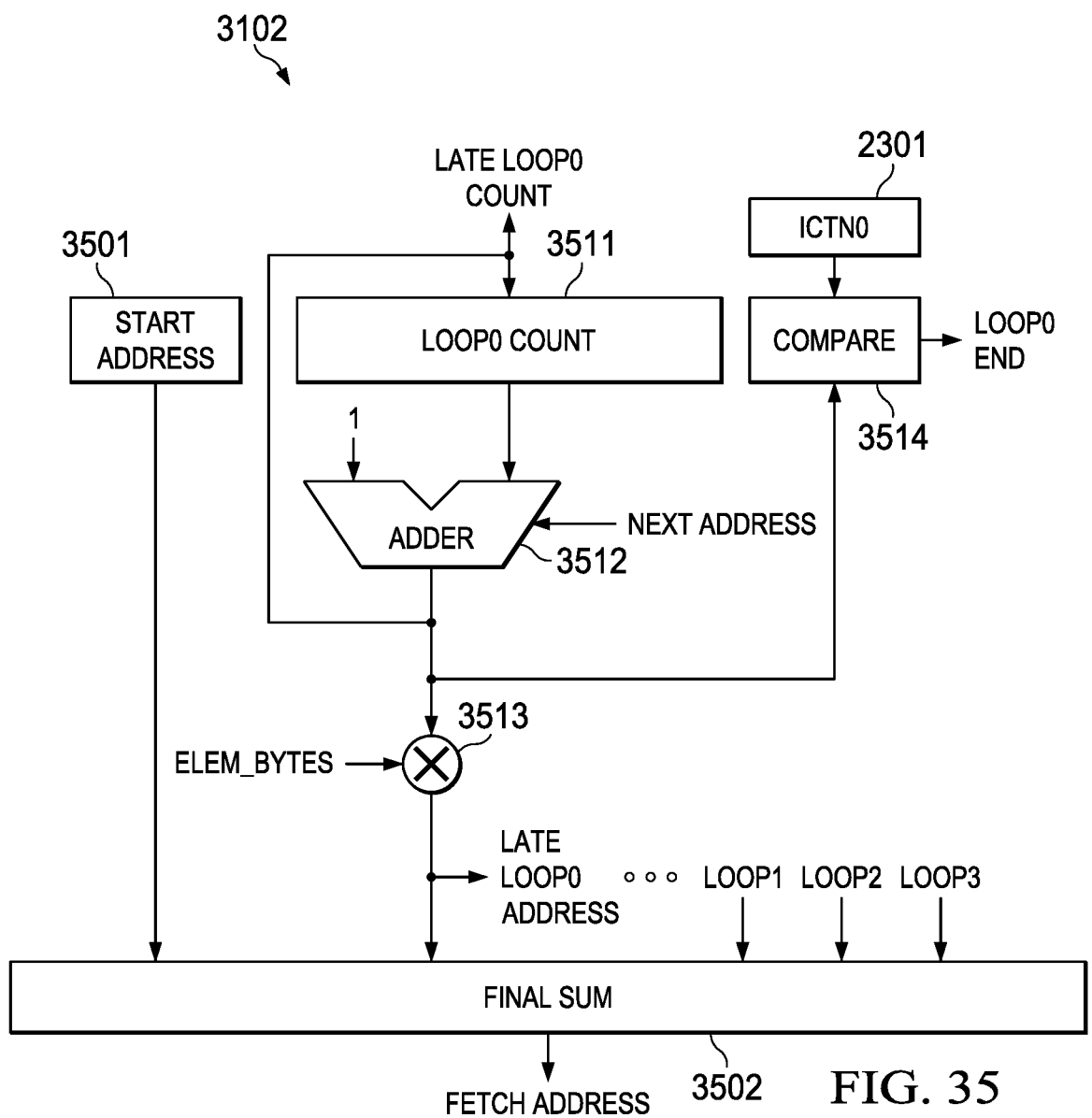
FIG. 35 is a partial schematic diagram illustrating generation of the late address and late loop count for loop 0.

FIG. 35 is similar to FIG. 33, illustrating exemplary circuits generating the late Loop 0 count and late Loop 0 address. A first loop of the stream employs Loop 0 count register 3511, adder 3512, multiplier 3513 and comparator 3514. Multiplier 3513 has a second input receiving the ELEM_BYTES. In FIG. 35 each iteration is trigged by a stream advance signal. Thus the count values of the late count circuits and the address values of the late addresses reflect the next data to be supplied to the functional units. This would be the stream elements stored in corresponding head registers 2218/2228. Circuits for loops Loop1, Loop2 and Loop3 are similar except the second input to the corresponding multipliers are the corresponding dimension DIM1, DIM2 and DIM3 of the corresponding stream template. A loop end signal generates an iteration of the next higher loop.

As described each streaming engine keeps two copies of the loop counts and loop addresses: an early copy which indicates where the streaming engine is currently fetching; and a late copy, which indicates the last iteration central processing unit core 110 has committed. In most cases, the late copy gives the clearest indication of the current state of the program. The early copy just indicates of how far the streaming engine has fetched ahead of central processing unit core 110. The difference between the early copies and the late copies reflects the amount of stream data stored in data storage 2716/2726. The count data and the address data are related. Any particular embodiment may include only count data, only address data or both.

It is known in the art that any count such as illustrated in FIGS. 33 and 35 may be embodied as count down or count up. FIGS. 33 and 35 illustrate count up embodiments. Those skilled in the art would understand how to modify initialization and comparisons to embody this invention in count down circuits. Additionally, those skilled in the art would understand how to modify the comparisons to embody the addressing modes described.

Figure 36:
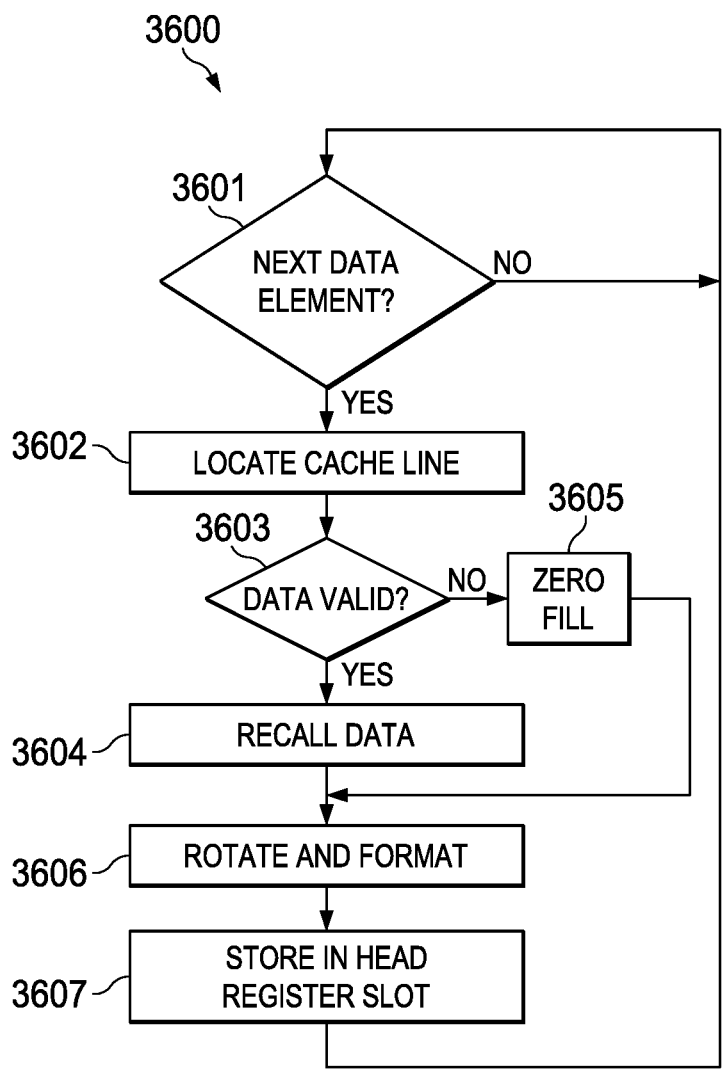
FIG. 36 is a flow chart illustrating the operation of the late address generator.

FIG. 36 is a flow chart 3600 illustrating the manner of filing the stream head register employing late address generator 3102. Flow chart 3600 begins at test block 3601. Test block 3601 determines whether a next data element of the data stream is to be loaded into the corresponding stream head register. As previously described, in the preferred embodiment stream data remains in the stream head register where it can be fetched more than once by plural functional units, until the streaming engine encounters a read and advance operand coding. Upon detecting a read and advance operand coding, the streaming engine supplies the current data in the head register to the requesting functional unit and replaces the data in the stream head register with the next sequential data in the data stream. As previously noted the streaming engine may fill the head register with more than one stream data element depending on the relationship of the specified stream data size to the vector size. If the stream head register data is not to be replaced (No at test block 3601), the control loops back to test block 3601 for another determination. Flow remains at test block 3601 until a replacement of data stored in the head register is required (Yes at test block 3601).

When a replacement of the head register is required (Yes at test block 3601), block 3602 obtains the address of data for the next head register fill. In the preferred embodiment this determination is made via the corresponding reference queue 2715/2725. Text block 3603 determines whether this just accessed cache line is valid. If the cache line is valid (Yes at text block 3603), then block 3604 recalls the data to a temporary buffer. If the cache line is not valid (No at text block 3603), then block 3605 zero fills the temporary buffer.

In either case block 3606 rotates and formats the data. This process has been described above. Data rotation aligns the data elements of the stream in the proper slots in the head register. Date formatting includes complex number sub-element swapping, data promotion, transposition and duplication as previously described. Following rotation and formatting, block 3607 stores the data in the corresponding head register 2718/2728 in vector slots as previously described.

Figure 37:
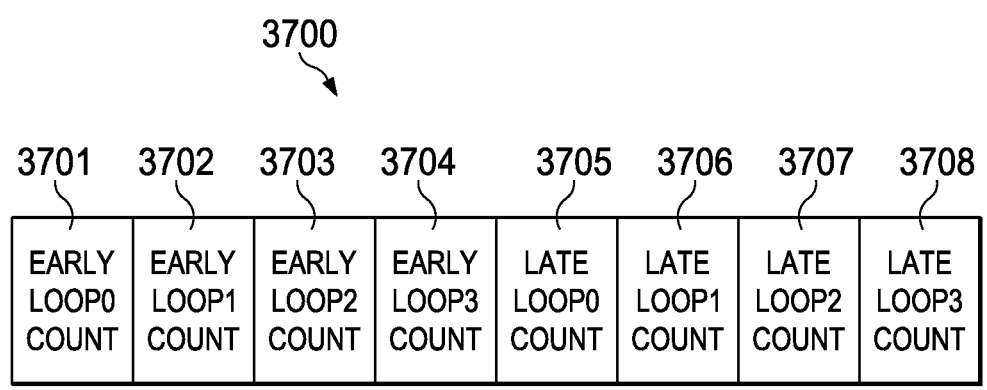
FIG. 37 illustrates an exemplary bit assignment of an extended control register storing early and late loop counts.

FIG. 37 illustrates an exemplary bit assignment of an extended control register (ECR) denoted SEn_ICNT 3700. According to the preferred embodiment streaming engine 2700 includes two such ECRs, SE0_INCT for stream 0 and SE1_INCT for stream 1. Each SEn_ICNT stores early and late loop counts of the loops defined in the corresponding stream template for each open stream. SEn_ICNT 3700 allows a programmer to determine where the streaming engine is within a given stream while debugging a program. In the preferred embodiment SEn_ICNT 3700 is accessible only by the debugger. Any other attempt to access SEn_ICNT 3700 generates a privilege error. SEn_ICNT 3700 includes early loop0 count 3701, early loop1 count 3702, early loop2 count 3703, early loop3 count 3704, late loop0 count 3705, late loop 1 count 3706, late loop2 count 3707 and late loop3 count 3708. Each count value field has a bit width at least as great as the bit width of the corresponding iteration count of the corresponding stream template register. The respective early and late counts are similar but updated at different times that will be further described below.

Figure 38:
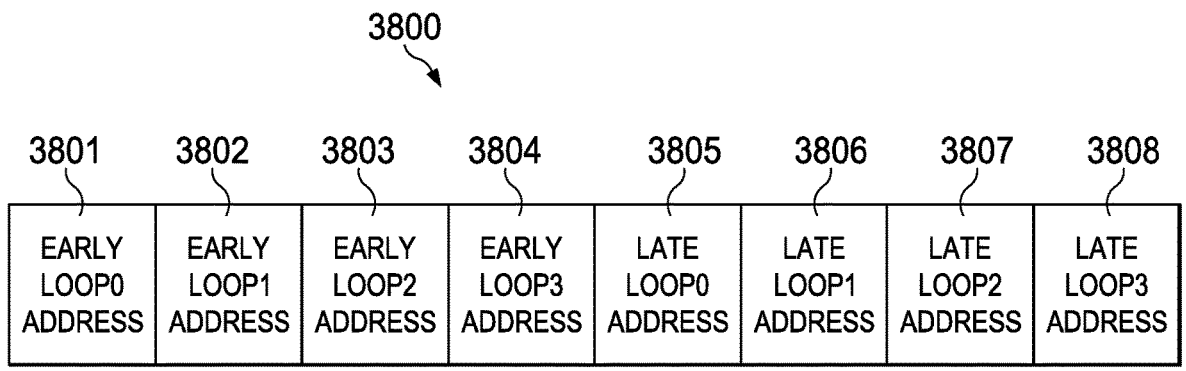
FIG. 38 illustrates an exemplary bit assignment of an extended control register storing early and late addresses.

FIG. 38 illustrates an exemplary bit assignment of an ECR denoted SEn_ADDR 3800. According to the preferred embodiment streaming engine 2700 includes two such ECRs, SE0_ADDR for stream 0 and SE1_ADDR for stream 1. Each SEn_ADDR stores early and late addresses of the loops defined in the corresponding stream template for each open stream. SEn_ADDR 3800 allows a programmer to determine where the streaming engine is within a given stream while debugging a program. In the preferred embodiment SEn_ADDR 3800 is accessible only by the debugger. Any other attempt to access SEn_ADDR 3800 generates a privilege error. SEn_ADDR 3800 includes early loop 0 address 3801, early loop 1 address 3802, early loop2 address 3803, early loop3 address 3804, late loop 0 address 3805, late loop1 address 3806, late loop2 address 3807 and late loop3 address 3808. Each address field has a bit width at least as great as the bit width of the addresses of processor 100. The respective early and late addresses are similar but updated at different times that will be further described below.

Streaming engine 2700 reports a range of faults including: programming errors; memory translation faults; bit errors detected in the storage array; bus errors reported by the system; and functional failures. Streaming engine reports faults synchronously, aligned to program execution.

Streaming engine 2700 reports faults synchronously by marking data from the streaming engine with a flag indicating a fault. This flagged data triggers an internal central processing unit core 110 exception event if and only if the program attempts to consume that data. Any instruction that attempts to consume the data marked as errant generates a central processing unit core 110 internal exception event. The relationship between errors recognized by streaming engine 2700 and the instructions that experience an exception does not depend on stall timing.

When streaming engine 2700 detects a fault to report, it marks the affected data in internal storage 2716/2726. In parallel, streaming engine 2700 records the details of the error in a corresponding pair of extended control registers, fault address register SEn_FAR and fault source register SEn_FSR. Each streaming has its own set of extended control registers SEn_FAR and SEn_FSR. Extended control registers SE0_FAR and SE0_FSR store data for stream 0 and extended control registers SE1_FAR and SE1_FSR store data for stream 1. Depending upon the error, streaming engine 2700 may also disable further request generation for the stream. In the preferred embodiment fault address register SEn_FAR and fault source register SEn_FSR are accessible only by the debugger.

Figure 39:
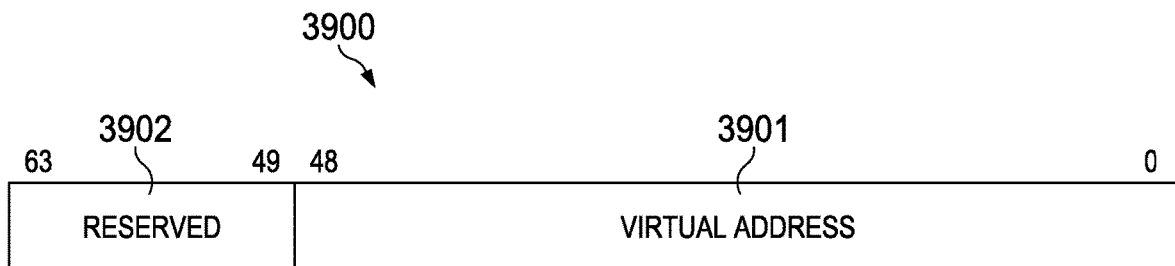
FIG. 39 illustrates an exemplary bit assignment of an extended control register storing the virtual address of a fetch generating an error in the streaming engine.

Streaming engine 2700 records the virtual address that triggered the error in the corresponding extended control register SEn_FAR. An exemplary SEn_FAR register 3900 is illustrated in FIG. 39. In the current embodiment each SEn_FAR register is 64 bits. A first field 3901 stores the virtual address of the streaming engine fetch generating the fault. In the preferred embodiment this virtual address is 49 bits (bits 0 to 40). The remaining bits of SEn_FAR register (second field 3902) are reserved and unused in the current example. These bits may be used if the virtual address of an embodiment exceeds 49 bits.

Figure 40:
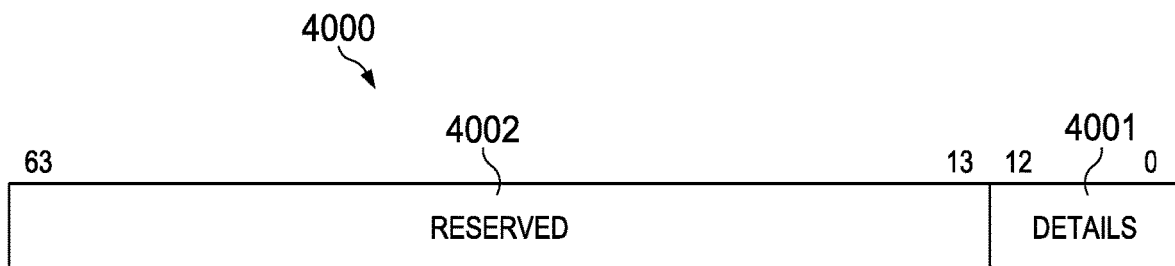
FIG. 40 illustrates an exemplary bit assignment of an extended control register storing data detailing the nature of a detected error.

Streaming engine 270 records a fault status in a corresponding register SEn_FSR. An exemplary SEn_FSR register 4000 is illustrated in FIG. 40. In the current embodiment each SEn_FSR register is 64 bits. A first field 4001 stores the details of the encounter fault. A second field 4002 (the remaining bits of SEn_FSR register 4000) are reserved and unused in the current example embodiment. Table 15 shows the coding of details field 4001 in SEn_FSR register 4000.

TABLE 15

| Error Code Bit Field 4001 | Error |
|---|---|
| 0000000000000 | No error |
| 11xxxxxxxxxxx | Memory management unit error |
| 1010000000xxx | Level 2 cache error |
| 1000000000000 | Reserved |
| 1000000000001 | Streaming Engine: internal storage parity error |
| 1000000000010 | Streaming Engine: invalid stream template |
| 1000000000011 | Streaming Engine: stream active mismatch |
| 1000000000100 | Streaming Engine: CPU spurious read while stream inactive |
| 1000000000101 | Streaming Engine: address bit 48 rollover |
| 1000000000110 | Streaming Engine: Level 2 cache fragmented data return |
| 1000000000111 | Reserved |

As shown in Table 15, bit 12 the most significant bit of bit field 4001 is 0 if there is no error and 1 if there is an error. A set of codings of bit field 4001 are set aside to indicate memory management unit errors. Memory management unit errors include memory translation faults such as: lack of privilege; lack of a valid translation entry for the presented virtual address; and an actual physical error encountered during translation. A second set of codings of bit field 4001 are set aside to indicate level 2 cache errors. Other coding indicate streaming engine errors.

A coding of "1000000000001" indicates a streaming engine internal storage data error. This indicates that the corresponding data storage 2716/2726 has an error. In the preferred embodiment parity bits are stored with the data bits. Upon use a new parity is computed from the data and compared with the stored parity. A difference between the new parity and the stored parity indicates an internal storage error.

A coding of "1000000000010" indicates a streaming engine stream template error. Upon opening a stream central processing unit core 110 indicates a stream template register storing the parameters for the data stream. Some feasible data codings of the stream template register (FIGS. 28 and 29) are produce combinations of options not supported by the preferred embodiment. These include: an element size after promotion and element duplication the exceeds the vector length; a transpose granule size after promotion, element duplication and decimation exceeds the vector length; invalid dimension or address alignment for transposed streams; enabling decimation while promotion is disabled; out of range iteration count for transposed stream; reserved encoding used in any field; and non-zero values in any reserved field. The latter two errors are indications of an improperly specified template.

A coding of "1000000000011" indicates a streaming engine active mismatch. This would occur when central processing unit core 110 attempts an operation not consistent with the current stream state (inactive, active, frozen).

A coding of "1000000000100" indicates a central processing unit core 110 spurious read while the stream is inactive. An inactive stream cannot be read. An attempt to read an inactive stream generates this error.

A coding of "1000000000101" indicates an address bit 48 rollover. Thought the virtual address has 49 bits it is generally stored in a 64 bit scalar register. Central processing unit core 110 sign extends the 49 bit virtual address to 64 bits for storage. Accordingly, change of bit 49 (the sign bit) of the virtual address is not permitted. Any stream data fetch operation toggling bit 49 of the virtual address generates this error.

A coding of "1000000000110" indicates a Level 2 cache fragmented data return. A stream data fetch that results in a fragmented data return from combined level 2 cache 130 generates this error.

The coding is "1000000000111" reserved and not used.

Upon detection of any of these streaming engine faults, the streaming engine attempts to store the virtual address of the data fetch generating the error in SEn_FAR and stores a corresponding error code in SEn_FSR as detailed above. The streaming engine is not always able to associate an address with every fault. In the preferred embodiment, the streaming engine is unable to report an error address in these circumstances: invalid stream state when activating frozen stream (bad STRRSTR); bit error in the data storage array during a transposed stream; bus error reported by the system during a transposed stream. In those circumstances, the streaming engine will clear SEn_FAR to 0. Because the streaming engine can generate multiple addresses in parallel to satisfy a single data-phase destined for central processing unit core 110, the streaming engines chooses one of those addresses to report if both addresses experience a fault. The streaming engine does not define an architectural order among these parallel addresses; rather, the address the streaming engine chooses to report the fault for when two faults occur in parallel is implementation defined.

Upon occurrence of these errors, the streaming engine does not immediately trigger an error to central processing unit core 110. The fault status flows with the affected data through the streaming engine data storage 2716/2726 as data is consumed by central processing unit core 110. Central processing unit core 110 triggers an internal exception event if and when the program actually consumes the data. Due to pipelined nature of central processing unit core 110, many cycles may pass between when the streaming engine detects a fault, and when central processing unit core 110 takes an exception. If the program never consumes the affected data, central processing unit core 110 will never generate an exception event. For example, if a program opens a stream with an invalid template and then closes this stream without reading any data from it, the streaming engine will not cause central processing unit core 110 to take an exception. This behavior treats streaming engine fetches as speculative until the program running on central processing unit core 110 actually consumes the data. If the fault is recoverable, such as a page fault, then the stream will resume at the point of the data item that triggered the exception when central processing unit core 110 returns from the exception event handler.

Figure 41:
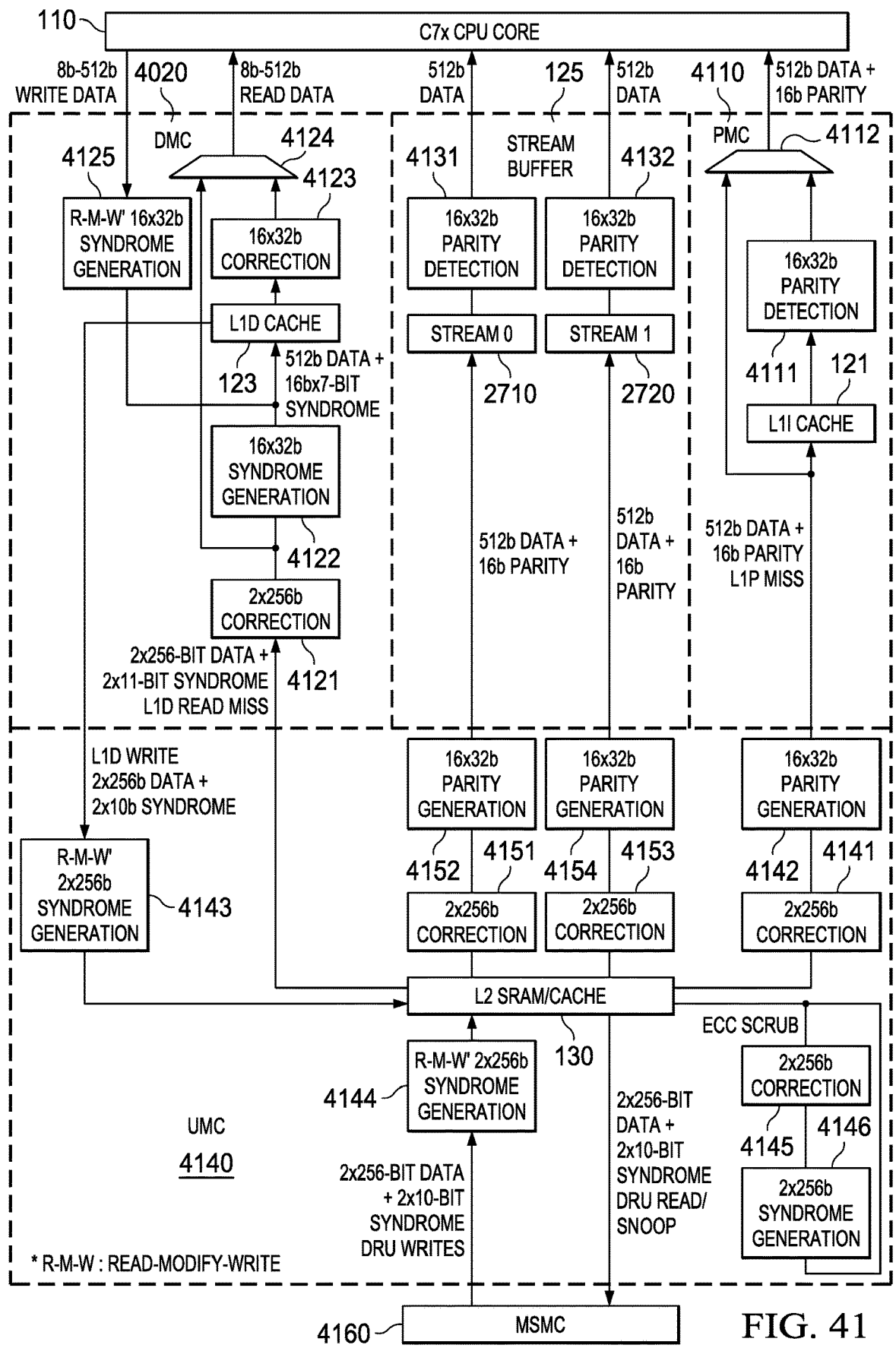
FIG. 41 illustrates the error detection and correction of this invention.

FIG. 41 illustrates error detection and correction of this invention. Parts illustrated in FIGS. 1 and 27 are given the same reference numbers. FIG. 41 illustrates connections between central processing unit core 110, level one instruction cache (L1I) 121, level one data cache (L1D) 123 and level two combined instruction/data cache (L2) 130.

FIG. 41 illustrates Program Memory Controller (PMC) 4110 including L1I cache 121 and error correcting hardware. L1I cache 121 receives data from L2 SRAM/cache 130 via 2×256 bit correction unit 4141 and 16×32 bit parity generator 4142. On supply of instructions to central processing unit core 110 the parity bits stored in L1I cache 121 are compared with newly calculated parity bits from 16×32 bit parity detector 4111. If they match the instructions are supplied to central processing unit core 110 via multiplexer 4112. If they do not match, the instructions are recalled from L2 SRAM/cache 130, then subject to the parity test again. On a cache miss in L1I cache 121, L2 SRAM/cache supplies the requested instructions to L1I cache 121 via 2×256 bit correction unit 4141 and 16×32 bit parity generator 4142 and in parallel supplies instructions directly to via multiplexer 4122.

FIG. 41 illustrates Data Memory Controller (DMC) 4120 including L1D cache 123 and error correcting hardware. L1D cache 123 receives data from L2 SRAM/cache via 2×256 bit correction unit 4121 and 16×32 bit parity generator 4122. On supply of data to central processing unit core 110 the parity bits stored in L1D cache 123 are compared with newly calculated parity bits from 16×32 bit parity detector 4123. If they match the data is supplied to central processing unit core 110 via multiplexer 4124. If they do not match, the data is recalled from L2 SRAM/cache 130, then subject to the parity test again. On a cache miss in L1D cache 123, L2 SRAM/cache supplies the requested data to L1D cache 123 via 2×256 bit correction unit 4121 and 16×32 bit parity generator 4122 and in parallel supplies data directly to central processing unit core 110 via multiplexer 4124.

Writes from central processing unit core 110 are subject to parity generation in 16×32 bit syndrome generator 4125. The data received from central processing unit core 110 and the calculated parity bits are stored in L1D cache 123.

On write back from L1D cache 123 newly calculate parity bits and the stored parity are compared in 2×256 bit syndrome generator 4143. If these match, the data is stored in L2 SRAM/cache 130. If they do not match, 2×256 bit syndrome generator 4145 attempts correction. If the correction is achieved, the corrected data is stored in L2 SRAM/cache 130. Failure of correction generates a fault.

FIG. 41 illustrates stream buffer 125 including separate stream 0 2710 and stream 1 2720. Stream 0 2710 receives data from L2 SRAM/cache via 2×256 bit correction unit 4151 and 16×32 bit parity generator 4152. On supply of data to central processing unit core 110 the parity bits stored in stream 2210 are compared with newly calculated parity bits in 16×32 bit parity detector 4131. If they match the data is supplied to central processing unit core 110. If they do not match, there is a fault. Stream 1 2720 operates similarly with 2×256 bit correction unit 4153, 16×32 bit parity generator 4154 and 16×32 bit parity detector 4132.

FIG. 41 illustrates Unified Memory Controller (UMC) 4140 including L2 SRAM/cache 130 and error correcting hardware. L2 SRAM/cache 130 receives data from multi-core shared memory controller (MSMC) 4160 via 2×256 bit syndrome generator 4144. New parity is generated for storage in L2 SRAM/cache 130 and correction is attempted if needed. Upon a non-match and failure of correction, the data is recalled from MSMC 4160, then subject to the parity test again. There are no parity checks or correction on writes from L2 SRAM/cache 130 to MSMC 4160.

Periodically 2×256 bit syndrome generation 4145 and 2×256 correction 4146 walks through the data stored in L2 SRAM/cache 130. The data and parity is recalled, new parity generated and checked and correction attempted if needed. If the data is correct, there is no change made in L2 SRAM/cache 130. If data is corrected, the corrected data is stored back in L2 SRAM/cache 130. Failure of data correction generates a fault.

High-performance computing systems, such as the above described streaming engines, need low-latency, high-bandwidth access to random access memory pools to properly utilize the available hardware. Memory performance scaling has not kept up with computer architecture and process enhancements leading to memory bottlenecks in many applications. These state-of-the-art memories, especially off-chip memories, require spatial and temporal locality to efficiently utilize the data bus and access to the data arrays. In multi-core systems, fast memory bandwidth resource tends to be scarce and many compute elements must share access to it. The arbiters providing this resource allocation will typically attempt to provide a fair distribution of the resource for similar priority traffic. This fairness can actually hinder memory efficiency by destroying temporal and spatial locality required to efficiently utilize the memory.

As an example of such a system masters A and B are attempting to access a memory Z. As greedy requestors, A and B will send as many requests as possible as fast as possible until they reserve all available data buffering capacity. Then they will stall until some of the previous requests return. In most systems with large, off-chip memories the memory return bandwidth is lower than the requestors issuing capacity. Thus data requests return slower than originally sent. For a greedy master, a new request goes out as soon as one returns. Once the data buffering is full, requests issue out and return at the speed of the memory return bandwidth leaving time gaps between requests. This results in an initial flurry of back-to-back requests until the data buffering is full, followed by a steady state with slow, one-by-one trickling requests matched to the memories return bandwidth.

This drop in the request rate from A and B requestors reduces the temporal and spatial locality of each request. This in turn reduces the efficiency of the memory access. This reduced memory efficiency further drops the request return rate causing the time gap between requests to grow, further reducing locality. This feedback relationship degrades system performance dramatically, especially as the more requestors enter the pool for access to memory Z.

The greedy master will utilize a request algorithm based on the number of requests needing to be sent (N) based on the program or function of the master and the number of requests the master is capable of sending (M) based on buffering, availability or other constraint. This algorithm typically looks something like:

1. If N==0, send no requests (none needed).
2. (N>0) and (N≤M), send N requests.
3. (N>0) and (N>M), send M requests.

As previously described, these greedy masters reduce the temporal and spatial locality of requests handled by the memory. This will generally result in more memory page changes and increased latency needed for swapping address translation entries. This invention introduces hysteresis in a greedy master request rate. This hysteresis adds a hysteresis command number (R) to the calculation and looks something like this:

1. If N==0, send no requests (none needed).
2. If (N>0) and (N≤M), send N requests.
3. If (N>0) and (N>M):
    a. If (M<R), wait until more buffering is available;
    b. If (M≥R), issue R requests.

In the second case (N≤M), there is more buffering available than requests to send. Thus all the pending requests should be sent. In the third case (N>M), there are more requests than available buffering. In this case, this invention uses a hysteresis. This hysteresis does not send any requests until a cluster of R requests can be sent together. This ensures that the requestor will cluster R requests together whenever there are more than R requests to send. This forced clustering potentially increases the latency on any individual command. However, this forced clustering ensures better temporal and spatial locality at the memory to maximize that efficiency. Since the overall system is bottlenecked on memory bandwidth, maximizing that utilization will result in an overall higher performing system.

Figure 42:
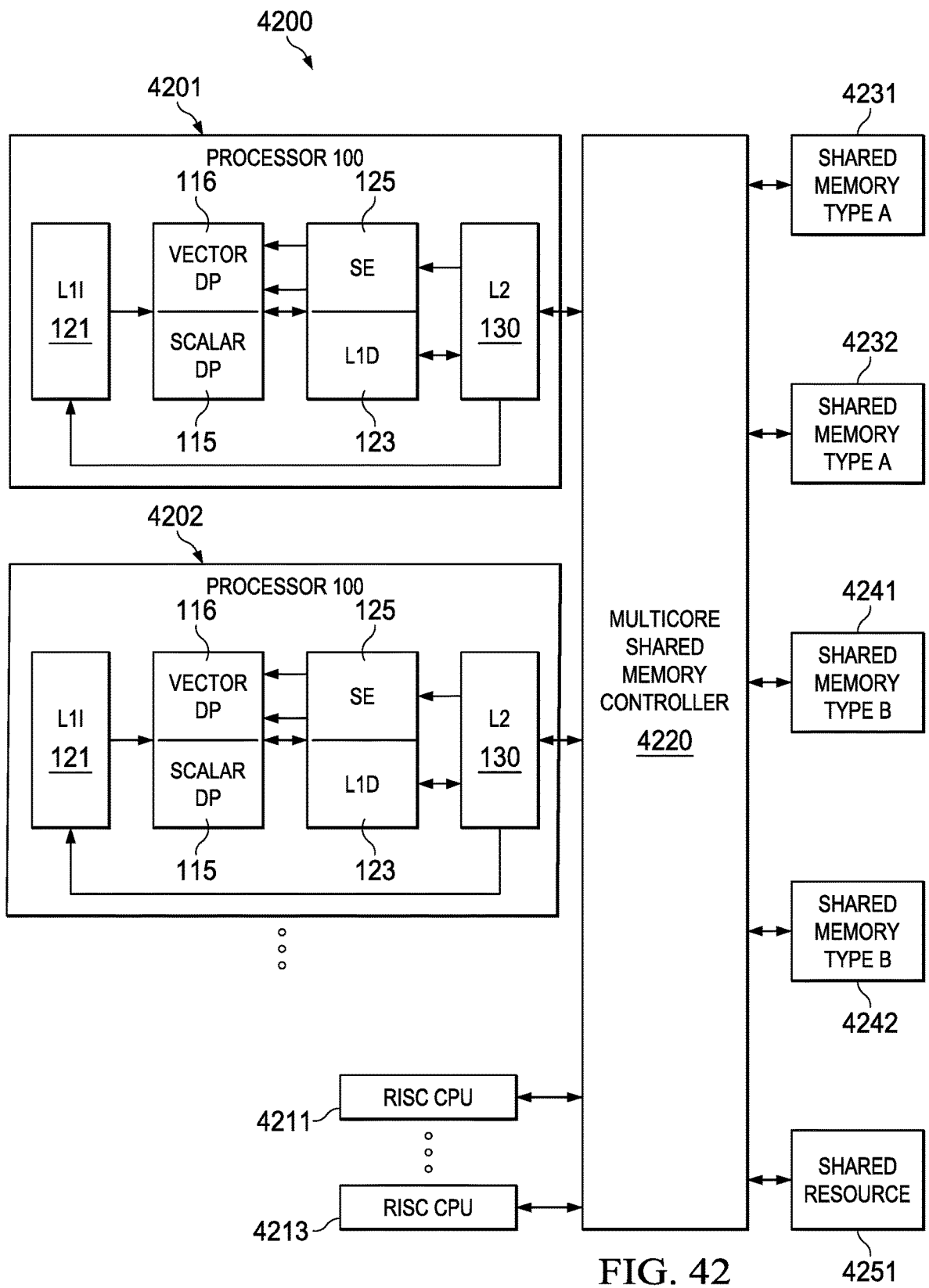
FIG. 42 is a schematic diagram illustrating a multiprocessor, multi-memory system to which the fetch hysteresis of this invention is applicable.

FIG. 42 illustrates a multiprocessor, multi-memory system 4200 to which the fetch hysteresis of this invention is applicable. System 4200 includes plural data processors. These include data processors 4201 and 4202, each consisting of a processor 100 as previously described. Each processor 4201 and 4202 includes a scalar data path 115, a vector data path 116, a level one instruction cache (L1I) 121, a level one data cache (L1D) 123, a streaming engine 125 and a level two combined instruction/data cache (L2) 130. These elements are connected and function as previously described. As indicated in FIG. 42, system 4200 may include additional data processors of the same type. System 4200 includes plural reduced instruction set computer (RISC) central processing units (CPUs) 4211 to 4213. These data processor types merely serve as examples of this invention and other data processors types of greater or lesser numbers are feasible.

Multiprocessor, multi-memory system 4200 includes plural memories of plural types. These include shared memory type A 4231 and 4232, and shared memory type B 4241 and 4342. System 4200 also includes shared resource 4251. Shared resource 4251 may include an input device, an output device or other type of device shared among the data processors 4201, 4202, 4211 and 4213. These memory types are mere examples and other memories and shared resource types of greater or lesser numbers are feasible.

Multicore shared memory controller 4220 mediates data movement between data processors 4201, 4202, 4211 . . . 4213 and resources 4231, 4232, 4241, 4342 . . . 4251. This mediation includes priority and sequencing, address translation and matching the data flow types of the various processors and memories.

The hysteresis of this portion of the invention assumes that access latency to at least some of the shared memories is enhanced when the accesses are temporally and spatially local rather than uncorrelated. For example, memories that support page mode accesses show reduced latency when accesses to the same page are adjacent in time. Memory access from a single source have a greater probability of exhibiting this temporal and spatial locality than temporally adjacent accesses from differing sources. Thus a technique that groups accesses from a single source for supply to a shared resource may reduce latency.

Figure 43:
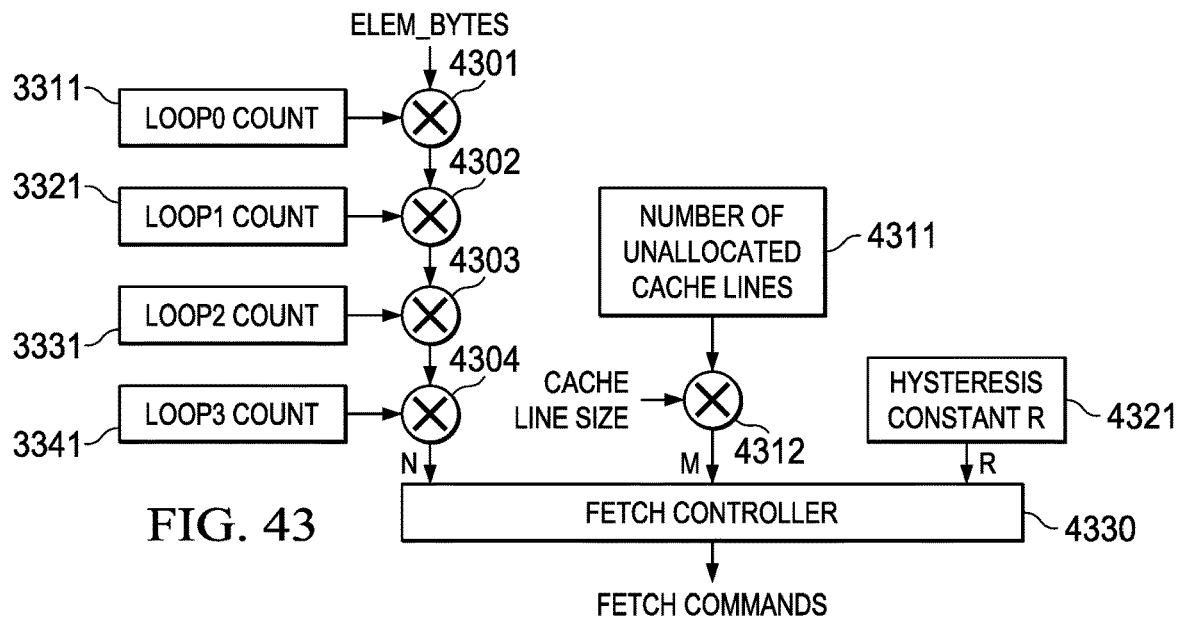
FIG. 43 is a partial schematic diagram illustrating hardware of an exemplary embodiment of this invention including a priority technique employing hysteresis.
Figure 44:
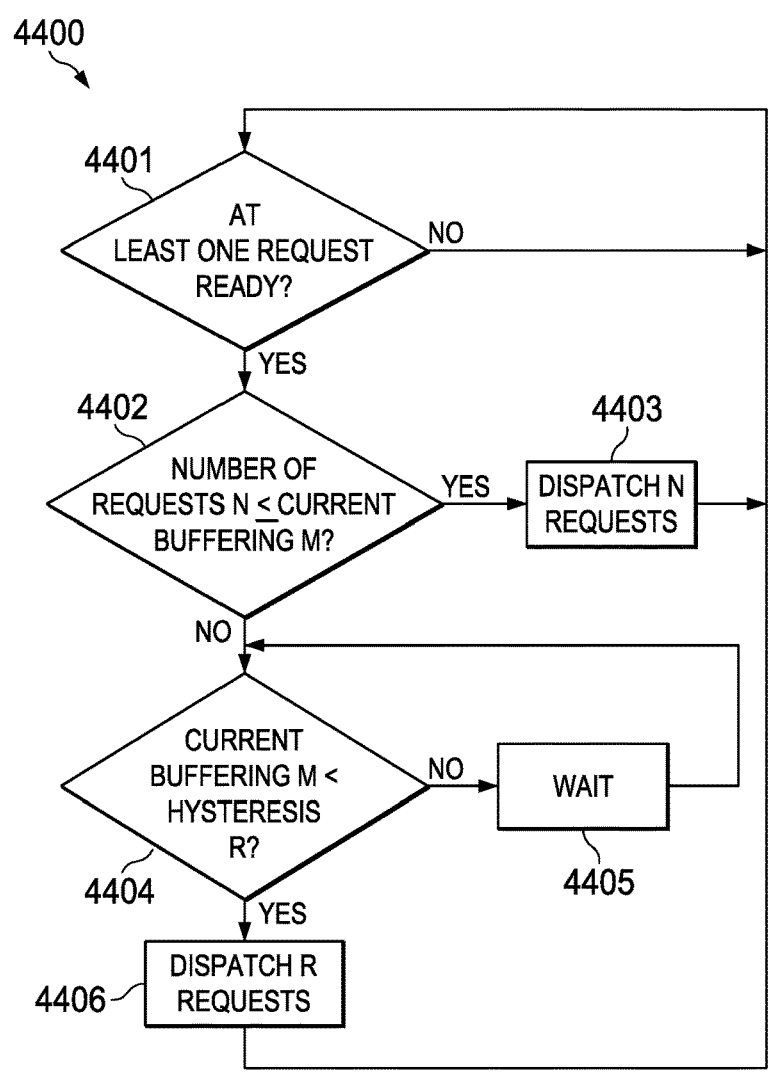
FIG. 44 is a flow chart illustrating a priority technique employing hysteresis.

FIGS. 43 and 44 illustrate application of this hysteresis to the streaming engine of this application. FIG. 43 illustrates a partial schematic diagram of the hardware practicing this invention. FIG. 44 illustrates the process of this aspect of the invention. This description assumes that the burst grouping happens between the streaming engine and the corresponding level two combined cache. In this case the level two combined cache will generally preserve burstiness on seeking service from a higher level memory. Those skilled in the art would realize that the hysteresis of this invention can be enforced at other locations within the multiprocessor system. For example, multicore shared memory controller 4220 could provide hysteresis for memory requests from RISC CPUs 4211 and 4213.

FIG. 43 illustrates computation of the number or pending requests N, the amount of buffering available M and the hysteresis value R. The number of pending requests N is computed using a plurality of multipliers 4301, 4301, 4303 and 4304. The first multiplier 4301 receives the quantity ELEM_BYTES as a first input. This is the size of the data elements of the defined data stream. As noted above, ELEM_BYTES is defined by the stream definition template. In the preferred embodiment the stream definition template includes a field EFLAGS, a subset of which is the ELTYPE field. As shown in Table 8, the ELTYPE field encodes the quantity ELEM_BYTES. This encoding is a mere example, those skilled in the art would recognize other feasible techniques to set the quantity ELEM_BYTES. The second input to multiplier 4301 is the quantity Loop 0 Count from the early count register 3311 illustrated in FIG. 33. Multiplier 4302 multiplies the product of multiplier 4301 by the quantity Loop1 count from early count register 3321 (not illustrated in FIG. 33, but analogous to Loop0 Count register 3311). Similarly, multiplier 4303 multiplies the product of multiplier 4302 by the quantity Loop2 Count from early count register 3331 and multiplier 4304 multiplies the product of multiplier 4303 by the quantity Loop3 Count from early count register 3341. Since the early loop count registers 3311, 3321, 3331 and 3341 store the remaining number of their corresponding loops, this quantity is the number of data element fetches required by the specified data stream. Multiplying by ELEM_BYTES thus yields the amount of data remaining to be fetched by the data stream. This quantity is designated N.

Block 4311 generates the number of cache lines within the corresponding data storage 2716/2726 that are unallocated. Multiplier 4312 multiples this product by the cache line size. This cache line size must be expressed in the same units as ELEM_BYTES. The product output of multiplier 4312 is the amount of available data buffering M. Upon initial opening of a data stream no cache lines would be allocated and the amount of available data buffering M would be at its maximum value. The amount of available data buffering M decreases upon allocation of a cache line to new data and increases upon deallocation of a cache line upon consumption of data by central processing unit core 110.

Register 4321 stores the hysteresis constant R. This is preferably a memory mapped register that can be written to by central processing unit core 110. Data in register 4321 is read for the fetch hysteresis of this invention.

Fetch controller 4331 forms the fetch determinations from the N, M and R inputs. This fetch determination is made as previously described and as shown in FIG. 44. This fetch determination is used in test block 3401 of FIG. 34 to determine whether to issue a fetch request from the streaming engine. Fetch controller 4331 counts the number of fetches issued and controls test block 3401 fetch issue accordingly. Fetch controller 4330 may be implemented in and asynchronous logic machine, as a finite state machine or as a properly programmed logic controller.

FIG. 44 is a flow chart illustrating processing 4400 of the fetch hysteresis. Test block 4401 determines whether at least one fetch request is ready. In the streaming engine embodiment this determines whether a stream is open that has not fetched and stored all the data elements. No fetches are required for closed streams. No fetches are required if all specified data elements have already been fetched and stored. If no request is ready (No at test block 4401), then test block 4401 repeats until at least one request is ready.

If at least one request is ready (Yes at test block 4401), then block 4402 compares the number of ready requests N to the amount of data buffering M currently available. In the streaming engine embodiment the number of ready requests R equals the number of not yet fetched data elements in the corresponding data stream multiplied by the data element size. In the streaming engine embodiment the amount of buffering M currently available equals the number of unallocated cache lines multiplied by the cache line size. If the number of ready requests R is less than or equal to the amount of data buffering M currently available (Yes at test block 4402), then block 4403 dispatches all N ready requests.

If the number of ready requests N is greater than the number of data buffering M currently available (No at test block 4402), test block 4404 determines whether the amount of data buffering M currently available is less than the hysteresis R. If the amount of data buffering M currently available is less than the hysteresis R (Yes at test block 4404), then block 4405 enters a wait state for one memory cycle. Flow then returns to test block 4404 to determine whether the amount of data buffering M currently available is less than the hysteresis R. In the streaming engine embodiment the amount of data buffering M depends upon the number of unallocated cache lines. As detailed above, cache lines in data storage 2716/2725 are deallocated when central processing unit 110 processes a read and advance instruction coding. In other embodiments the amount of data buffering would generally be reduced upon consumption of the data fetched. Process 4400 remains in this loop until the amount of data buffering M is greater than or equal to the hysteresis R.

If the amount of data buffering M currently available is greater than or equal to the hysteresis R (No at test block 4404), then block 4406 dispatches R requests. As noted above in the streaming engine embodiment this allows process 3400 to advance beyond test block 3401 in fetching the data stream.

The hysteresis of this aspect of the invention requires that no requests are sent until a cluster of R requests can be sent together. This clusters R requests together whenever there are more than R requests ready. This forced clustering potentially increases the latency on any individual command. However, this forced clustering ensures better temporal and spatial locality at the memory to maximize that efficiency. The memory system accessed may include further address translation or may include memories that have reduced latency for back-to-back same page accesses. The forced clustering makes better use of such memory assets. The force clustering reduces the probability of needing to change a table look entry in address translation hardware because the clustered requests more likely have spatial locality. This tends to avoid the need for address translation entry swaps. Because the latency for such address translation entry swaps is indeterminate and may be lengthy, average latency is reduced. The more likely spatial locality of such clustered requests is more likely to permit back-to-back accesses to the same memory page. This also tends to reduce average latency.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A data processing system comprising:
a processing core;
a memory; and
a streaming engine configured to receive a plurality of data elements stored in the memory and to provide the plurality of data elements as a data stream to the processing core, the streaming engine including:
a fetch controller to send requests from the streaming engine to access the memory to retrieve the data elements; and
a buffer to store data elements retrieved from the memory;
wherein the fetch controller is configured to:
determine a number of pending requests (N) to be sent to the memory by the streaming engine;
determine a number of requests (M) that the streaming engine can send based on an amount of available storage in the buffer;
compare M to N;
when N is both greater than zero and less than or equal to M, send the N pending requests from the streaming engine to the memory; and
when N is both greater than zero and greater than M:
comparing M to a hysteresis value (R); and
when M is not less than R, sending R requests of the N pending requests from the streaming engine to the memory.

2. The data processing system of claim 1, wherein the streaming engine includes a register to store the hysteresis value.

3. The data processing system of claim 2, wherein the register is a memory mapped register accessibly by the processing core.

4. The data processing system of claim 1, wherein data stream includes a plurality of nested loops with each loop having loop count, and wherein N is determined based on the loop counts and a size of the data elements of the data stream.

5. The data processing system of claim 4, wherein N is determined as the product of each of the loop counts and the size of the data elements of the data stream.

6. The data processing system of claim 4, wherein the streaming engine includes a stream template register to store a stream definition template, the stream definition template include a respective field for specifying each of the loop counts.

7. The data processing system of claim 1, the buffer includes a plurality of cache lines, each cache line having a cache line size, and wherein M is determined based on how many of the cache lines in the buffer are unallocated.

8. The data processing system of claim 1, wherein the buffer is configured to store data elements retrieved from the memory in response to the pending requests, and wherein the streaming engine includes an output to the data elements retrieved from the memory to the processing core as part of the data stream.

9. The data processing system of claim 1, wherein the memory is a level two (L2) cache of the data processing system.

10. The data processing system of claim 1, wherein, when N is both greater than zero and greater than M, the fetch controller is further configured to:
when M is less than R, wait a period of time without sending any of the N pending requests to the memory; and
after the period of time:
determine whether M is still less than R; and
sending R requests of the N pending requests from the streaming engine to the memory in response to a determination that M is not less than R.

11. The data processing system of claim 10, wherein the period of time is one memory cycle of the data processing system.

12. The data processing system of claim 1, wherein the buffer is a first-in-first-out (FIFO) buffer.

13. The data processing system of claim 1, wherein the processing core includes a digital signal processing (DSP) core.

14. The data processing system of claim 1, wherein the data processing system is a system on a chip (SOC) integrated circuit.

15. A method for sending requests to access a memory in a computing system, the method comprising:
determining a number (N) of pending requests to be sent to the memory by a requestor of the computing system;
determining a number (M) of requests that the requestor is limited to sending based on an amount of available buffering resources;
comparing M to N;
when N is both greater than zero and less than or equal to M, sending the N pending requests to the memory; and
when N is both greater than zero and greater than M:
comparing M to a hysteresis value (R); and
when M is not less than R, sending R requests of the N pending requests from the requestor to the memory.

16. The method of claim 15, comprising:
when N is both greater than zero and greater than M;
when M is less than R, waiting a period of time without sending any requests from the requestor; and
after the period of time:
determining whether M is still less than R; and
sending R requests of the N pending requests from the requestor to the memory in response to determining that M is not less than R.

17. The method of claim 16, comprising:
when M is still less than R after the period of time:
waiting an additional period of time without sending any requests from the requestor; and
after the additional period of time:
determining whether M is still less than R; and
sending R requests of the N pending requests from the requestor to the memory in response to determining that M is not less than R.

18. The method of claim 16, wherein the period of time is equivalent to one memory cycle of the computing system.

* * * * *